US012365073B2

(12) United States Patent
Siemers

(10) Patent No.: US 12,365,073 B2
(45) Date of Patent: Jul. 22, 2025

(54) NAIL DRIVING TOOL, MOVABLE GUIDE ELEMENT, STATIONARY GUIDE ELEMENT, KIT, BASE FOR SUCH KIT, SYSTEM, AND RETROFITTING SYSTEM

(71) Applicant: Raimund Beck Nageltechnik GmbH, Mauerkirchen (AT)

(72) Inventor: Stefan Siemers, Burghausen (DE)

(73) Assignee: Raimund Beck Nageltechnik GmbH, Mauerkirchen (AT)

( * ) Notice: Subject to any disclaimer, the term of this patent is extended or adjusted under 35 U.S.C. 154(b) by 183 days.

(21) Appl. No.: 18/022,952

(22) PCT Filed: Aug. 26, 2021

(86) PCT No.: PCT/EP2021/073604
§ 371 (c)(1),
(2) Date: Feb. 23, 2023

(87) PCT Pub. No.: WO2022/043434
PCT Pub. Date: Mar. 3, 2022

(65) Prior Publication Data

US 2023/0311286 A1 Oct. 5, 2023

(30) Foreign Application Priority Data

Aug. 26, 2020 (DE) ......................... 102020122342.0

(51) Int. Cl.
*B25C 7/00* (2006.01)
*B25C 1/04* (2006.01)

(52) U.S. Cl.
CPC ................ *B25C 7/00* (2013.01); *B25C 1/047* (2013.01)

(58) Field of Classification Search
CPC ........... B25C 7/00; B25C 1/047; B25C 1/008; B25C 1/188; B25C 1/005; B25C 1/184; B25C 1/003; B25C 1/00; B25C 1/001; B25C 1/18; B25C 5/16; B25C 5/1658; B25C 5/1665
See application file for complete search history.

(56) References Cited

U.S. PATENT DOCUMENTS 4,136,810 A 1/1979 Bull
6,578,749 B1 6/2003 Shen et al.
6,739,490 B1 5/2004 Shkolnikov et al.
8,123,096 B2 2/2012 Ijima et al.
(Continued)

FOREIGN PATENT DOCUMENTS

DE 20212296 U1 10/2002
EP 1231028 A2 8/2002
(Continued)

*Primary Examiner* — Veronica Martin
(74) *Attorney, Agent, or Firm* — CALDERON SAFRAN & WRIGHT P.C.

(57) ABSTRACT

The present invention relates to a nail driving tool, in particular a compressed air nailer, with a main body (2), which comprises a running tube (3) for guiding a nail to be driven into a workpiece and a firing pin driving the nail, the running tube (3) extending between a front free end (4), where the nail exits as it is driven into a workpiece, and a drive-side rear end. The invention also relates to a movable guide element (17) and to a stationary guide element (42), which can be mounted selectively to the nail driving tool.

11 Claims, 18 Drawing Sheets

(56) References Cited

U.S. PATENT DOCUMENTS

| | | | | |
|---|---|---|---|---|
| 10,350,741 | B2 | 7/2019 | Brendel et al. | |
| 2008/0290129 | A1 | 11/2008 | Schell et al. | |
| 2009/0072000 | A1* | 3/2009 | Iijima | B25C 1/188 227/120 |
| 2017/0120432 | A1* | 5/2017 | Brendel | B25C 1/06 |

FOREIGN PATENT DOCUMENTS

| | | | |
|---|---|---|---|
| EP | 1741519 | A1 | 1/2007 |
| JP | 2004330366 | A | 11/2004 |

* cited by examiner

NAIL DRIVING TOOL, MOVABLE GUIDE ELEMENT, STATIONARY GUIDE ELEMENT, KIT, BASE FOR SUCH KIT, SYSTEM, AND RETROFITTING SYSTEM

CROSS-REFERENCE TO RELATED APPLICATIONS AND CLAIM TO PRIORITY

This application is a national stage application of International Application No. PCT/EP2021/073604 filed Aug. 26, 2021, which claims priority to German Patent Application No. 10 2020 122 342.0 filed Aug. 26, 2020, the disclosures of which are incorporated herein by reference and to which priority is claimed.

FIELD OF THE INVENTION

The present invention relates to a nail setting device, in particular a pneumatic nailer, having a base body which comprises a barrel for guiding a nail to be driven into a workpiece and a firing pin driving the nail, the barrel extending between a front free end, via which the nail emerges when being driven into a workpiece, and a rear end on the drive side, wherein the barrel internally forms a firing channel along a firing channel axis and has an open front end section in which it surrounds the firing channel only over a partial circumferential portion.

Furthermore, the invention relates to a basic body for a kit for retrofitting a guide element to a nail setting device, wherein the nail setting device has a base body which comprises a barrel for guiding a nail to be driven into a workpiece and a firing pin which drives the nail, the barrel extending between a front free end, via which the nail emerges when being driven into a workpiece, and a rear end on the drive side, wherein the barrel internally forms a firing channel along a firing channel axis and has a front end section in which it surrounds the firing channel over only a partial circumferential portion.

In addition, the present invention relates to a movable guide element and a stationary guide element for detachable attachment to a nail setting device or to a basic body of a kit for retrofitting of a guide element to a nail setting device.

Finally, the present invention relates to a nail setting device and a movable guide element attached thereto, and to a kit for retrofitting a guide element to a nail setting device comprising a basic body and a movable guide element attached thereto. In addition, the invention relates to a system comprising a nail setting device, a movable guide element and a stationary guide element, and a retrofit system comprising a basic body, a movable guide element and a stationary guide element.

BACKGROUND OF THE INVENTION

Nails are among the oldest known fasteners in construction technology, such as house building, shipbuilding, armor technology, etc., mostly in connection with the material wood. A distinction must be made between nails made of metal, mostly iron or steel, and wooden nails, which in recent years have been increasingly used to join one or more components made of wood. Traditionally, nails are driven into the material to be nailed with hammers. This usually requires several hammer blows, with the risk of bending the nail if the nail head is not hit in the extension of the nail shaft.

With increasing industrialization, production speed is becoming more and more important for economic reasons. For this reason, tools have been developed with which nails can be driven into the components to be joined more quickly than with a hand-held hammer. These include, above all, nail setters, which can be equipped with different drive concepts. Compressed air nailers, which are usually operated at pressures of 5 to 6 bar, are of particular importance. Such pneumatic nailers can achieve driving speeds of around 25 meters per second.

Common pneumatic nailers have a base body which comprises a barrel for guiding a nail to be driven into a workpiece and a firing pin which drives the nail. In a modular pneumatic nailer, in particular, the base body can form a tool nose or be part of a tool nose to which a device for applying compressed air is connected at the rear. The barrel extends between a front free end, which is placed on the workpiece for driving in a nail, and a rear drive end, which is fluidically connected to the device for applying compressed air, and forms a firing channel on the inside. For driving in a nail, by manual operation of a trigger or by automated operation, the firing pin is acted upon with compressed air so that it moves at high speed in the firing channel in the direction of the free end of the barrel and drives a nail into a workpiece.

Pneumatic nailers of this type are widely used in particular for driving metal nails. In recent years, pneumatic nailers have also been increasingly used to drive wooden nails directly into components to be joined together without drilling a pilot hole. In order to increase processing speeds, nails are joined to form stiff or flexible nail strips so that the nails can be fed automatically one after the other to the firing channel.

If a metal nail hits a hard spot in the workpiece to be joined, the nail is compressed and deforms. To allow the nail to deform radially to the firing channel, the barrels of commercially available pneumatic nailers have an open front end section in which the barrel surrounds the shot channel over only a partial circumferential section. Since wooden nails do not have the ductility of metal nails, the material bond breaks down when they hit a hard surface, so that the wood fibers contained in the wooden nail exert radial pressure on the barrel of the nail setter under the axial pressure exerted by the striking pin due to their then no longer aligned structure. It has been found that this pressure can exceed the strength of the components of the nail setting device, in particular the barrel and the firing pin.

Furthermore, when feeding wooden nails from a nail strip, the problem arises that they slip relative to each other in the nail strip due to vibrations of the setting device, which can cause disturbances in nail feeding.

SUMMARY OF THE INVENTION

The task of the present invention is thus to further design a nail setting device of the aforementioned type in such a way that it is characterized by particular reliability and ease of operation and, in particular, avoids the aforementioned disadvantages.

This task is solved in a nail setting device of the type mentioned above in that the nail setting device comprises fastening means which are designed and suitable for selectively detachably fastening to the base body a movable guide element which can be pivoted about a pivot axis relative to the base body between a radially inner guide position in relation to the firing channel axis, in which it partially closes the open front end section of the barrel and guides a nail to be driven in and the firing pin driving it along the firing channel axis, and a radially outer deflection position, in which radial deflection of a nail to be driven in is possible, or a stationary guide element, which closes the open front end section of the barrel at least partially, in particular over the entire circumference, and guides a nail to be driven in and the firing pin driving it along the firing channel axis.

Furthermore, the task underlying the invention is solved by a basic body for a kit for retrofitting a guide element to a nail setting device of the type mentioned at the beginning, wherein the basic body has fastening means which are designed and suitable for selectively detachably fastening to the basic body a movable guide element which can be pivoted about a pivot axis relative to the basic body between a guide position, in which it is adapted to partially close the open front end section of the barrel and to guide a nail to be driven and the firing pin driving it along the firing channel axis, and a deflection position, in which radial deflection of a nail to be driven is possible, or a stationary guide element, which is suitable for at least partially closing the open front end section of the barrel, in particular over the entire circumference, and to guide a nail to be driven in and the firing pin driving the nail along the firing channel axis.

Accordingly, the task underlying the invention is also solved by a movable guide element for detachable attachment to a nail setting device or a basic body, which can be attached to a nail setting device or a basic body in such a way that it can be moved between a radially inner guide position relative to the firing channel axis, in which it partially closes the open front end section of the barrel and guides a nail to be driven in and the firing pin driving the nail along the firing channel axis, and a radially outer deflection position in which radial deflection of a nail to be driven in is possible, about a pivot axis relative to the base body.

Similarly, according to the invention, a stationary guide element of the type mentioned above is provided to be immovably attachable to a nail setting device or a basic body of a kit for retrofitting a guide element to a nail setting device in such a way that it at least partially closes the open front end section of the barrel and guides a nail to be driven in and the firing pin driving the nail along the firing channel axis.

The invention is based on the basic idea of providing a movable or a stationary guide element at the front end section of the firing channel, which is partially open, depending on the type of nail to be driven or the ambient conditions. Tests have shown that a stationary guide element is advantageous in particular for shorter nails, preferably those with a length of less than 65 mm, made of lignocellulosic material, for example wood, and enables reliable driving into a component. On the other hand, in the case of longer nails, it has proved advantageous to design the front end section of the firing channel in such a way that radial forces which can occur when a wooden nail collapses can be absorbed by a movable guide element functioning like a flap. The movable guide element is thereby able to guide the wooden nail to be driven in and the firing pin in the direction of the open end section of the firing channel, and at the same time to deflect laterally when radial forces occur as a result of a collapsing nail, thus absorbing the radial forces of the nail and the firing pin. Preferably, the movable guide element is designed in such a way that it tightly guides a nail to be driven in its guide position and moves out of its guide position when the firing pin strikes, in order to intercept the firing pin in a defined manner and to avoid mechanical overloading of the firing pin and the mechanical components.

In principle, it is conceivable to equip a nail setting device directly with such a movable or stationary guide element. By means of the kit according to the invention, it is also possible to retrofit existing nail setting devices with such guide elements.

In principle, the nail setting device according to the invention can also have a modular design. In this case, for example, it can comprise a device nose, which is at least partially formed by the base body. Functionally separated from this device nose, a device for generating and applying compressed air can be provided. For this purpose, connecting means can be provided which enable the base body to be connected to a device for applying compressed air. For example, a flange can be formed at the rear end of the base body for this purpose.

Insofar as the individual components, such as the movable guide element or the stationary guide element or the basic body for a kit are described below, details refer to the installed condition. If, for example, reference is made to a (radially) inner end face in connection with a guide element, this refers to the end face which points radially inwards towards the firing channel axis when the guide element is attached to a nail setting device.

Preferably, the fastening means of the nail setting device according to the invention, or of the basic body according to the invention, comprise a fastening protrusion which is configured to engage into a corresponding recess of a movable guide element or of a stationary guide element.

The fastening means of the nail setting device, or of the basic body of a kit for retrofitting a guide element to a nail setting device, can comprise a fastening bore which runs offset from the firing channel axis in order to be able to pivotably mount a movable guide element on the nail setting device. In a nail setting device according to the invention, the bore axis of the fastening bore can lie in a plane extending perpendicularly to the firing channel axis. Accordingly, the bore axis of the fastening bore of the basic body according to the invention can be configured to extend in a plane perpendicular to the firing channel axis when the basic body is attached to a nail setting device.

Correspondingly, the movable guide element according to the invention may have bearing means for pivotably bearing the movable guide element relative to the base body of a nail setting device or to the basic body of a kit. Specifically, these bearing means can comprise a bearing bore which completely penetrates the movable guide element, in particular in a rear region, and by means of which—for example via a bolt or a screw—the guide element can be pivotably mounted on the nail setting device or on the basic body. In basically the same way, fixing means can be provided at a stationary guide element in order to releasably attach the guide element to a nail setting device or to the basic body of a kit for retrofitting of a guide element to a nail setting device. These fixing means may comprise a retaining bore, which passes through the stationary guide element so that by means of a bolt or screw or the like the guide element can be releasably attached to a nail setting device or to a basic body of a kit.

In the nail setting device according to the invention and the basic body according to the invention, stop means can be provided to limit the movement of an attached movable guide element in the direction of the guide position and/or to position an attached stationary guide element relative to the base body or the basic body.

The stop means can comprise at least one stop face, which is formed on the nail setting device or on the basic body and preferably points towards the firing channel axis. It is also conceivable that two different stop faces are provided, which are stepped relative to one another, whereby one stop face serves to limit the movement of the movable guide element in the direction of the guide position and the other stop face serves to position the stationary guide element.

Correspondingly, a counter surface can be formed on the movable guide element, which preferably lies in a rear section of the movable guide element, in particular is formed by a web, and can be brought into contact with a corresponding stop face of the nail setting device or the basic body. In other words, the stop means define the guide position of the movable guide element, so that any further movement of the guide element into the firing channel is excluded. The stop means, or the corresponding counter surface of the movable guide element, can be designed in such a way that the movable guide element does not touch the opposite section of the barrel. Wood fibers can escape through such a gap between the guide element and the barrel in the event of a collapsing nail.

Similarly, the stationary guide element according to the invention can have a contact face which can be brought into contact with a corresponding stop face of the nail setting device or of the basic body of a kit for the retrofitting a guide element to a nail setting device in order to position the stationary guide element on the nail setting device or on the basic body. This embodiment is based on the consideration that a clear positioning is possible by realizing a flat contact of the contact face of the stationary guide element against the corresponding stop surface and at the same time by means of a bolt or a screw the retaining bore is arranged in alignment with the fastening bore.

The nail setting device according to the invention can be designed in such a way that the barrel surrounds the shot channel in an open front end section over a circumferential angle of at least 160° and/or at most 200°, preferably over a circumferential angle of 180.

Furthermore, the nail setting device can have a feeding device for nails which defines a feed axis along which nails oriented parallel to one another are successively fed to the firing channel in order to be driven into a workpiece. The feed axis preferably extends transversely to the firing channel axis. In a concrete embodiment, the firing channel axis and the feed axis can enclose an acute angle towards the rear, in particular an angle of at least 60° and/or of at most 85°, preferably of about 75.

The nail setting device can be designed in such a way that a guide rail extending parallel to the feed axis and in front of the feed axis is provided in order to support nails to be fed at their tip. Similarly, in the basic body for a kit according to the invention, a guide rail may be provided which is designed and arranged such that, after the basic body is attached to the nail setting device, it extends parallel to the feed axis and in front of the feed axis in order to support to be fed nails at their tip. These embodiments are based on the idea of providing a rail projecting from the barrel, against which the nails to be fed can strike with their tip should they become detached from the nail strip. This prevents the nails from slipping forward out of the nail strip and blocking the supply of nails to the barrel.

The nail setting device according to the invention is preferably designed in such a way that the guide rail is formed integrally with the base body. Alternatively, it is conceivable that the guide rail is detachably fastened to the base body, in particular screwed thereto. Similarly, in a basic body according to the invention, the guide rail can be formed integrally with the basic body. It is also possible for the basic body to be formed in several parts and for the guide rail to be screwed to the rest of the basic body as a separate component, for example.

If the guide rail and the base body of the nail setting device or the basic body of the kit are designed as separate components, a rearward-facing contact surface can be provided for support at a front end region of the base body or the basic body, against which the guide rail rests. This fixes the position of the guide rail when it is screwed on or otherwise fastened, so that slipping or rattling of the guide rail is prevented.

In order to improve the guidance of the nails to be fed along the feed axis, a longitudinal groove extending in its longitudinal direction and having an in particular V-shaped cross-section can be formed in the guide rail in the rearwardly-facing side, the opening angle of the cross-section being approximately 140, for example.

In a further embodiment, the guide rail can have a feeding slope directed towards the rear at its radially outer end region relative to the firing channel axis in order to prevent nails to be fed from blocking. In other words, a feeding slope is provided to force nails that have already slipped a little out of the nail strip back into their correct position in the nail strip during feeding.

In a further embodiment of the nail setting device, the fastening means may be arranged directly on the guide rail at a radially inner end region. Similarly, in a basic body for a kit for retrofitting a guide element to a nail setting device in which a guide rail is provided, the fastening means can be arranged on the guide rail, in particular on a radially inner end region of the guide rail. This allows the movable or stationary guide element to be attached directly to the guide rail. The guide rail can engage in a central recess of the respective guide elements.

The central recess of the movable guide element and the guide rail can be designed in such a way that the guide rail fills the central recess over its entire width, so that there is practically no gap between the guide rail and the two webs which laterally delimit the central recess of the movable guide element. This can prevent a gap from filling with wood fibers in the event of a collapsing nail and impairing the pivoting movement of the movable guide element.

In order to attach the basic body or kit of the invention to a nail setting device, attachment means may be provided on the basic body of the kit for attachment to a base body of a nail setting device. Specifically, the attachment means may include threaded holes for screwing to a nail setting device. For positioning the base body on a basic body of a nail setting device, a contact surface may be formed on the basic body, which contact surface is provided for abutment against a corresponding mating edge of the base body of a nail setting device.

Preferably, the movable guide element has a linearly extending guide groove for guiding a nail to be driven in and a firing pin in an inner end face facing the firing channel axis when it is fastened to the nail setting device. A guide groove, which preferably extends in the direction of the firing channel axis when the movable guide element is in its guide position, enables stable guiding of a nail to be driven, which slides along the movable guide element during driving into a workpiece.

In a further embodiment, the guide groove may have a V-shaped cross section, the opening angle being in particular at least 60° and/or at most 120°, preferably about 90°. With a V-shaped basic form, a two-point support is realized for a nail with a circular cross section. With an opening angle of 90°, the support points are also located on the contour of the nail offset from one another by an angle of 90°.

In the installed state, the end face pointing radially inwards to the firing channel axis can have further face sections in addition to the guide groove. Preferably, a flat end face section adjoins the guide groove laterally on both sides, viewed from the groove center, the two end face sections lying in particular in one plane. Further outwardly, chamfered slopes can follow in the transition to the side surfaces bounding the movable guide element, which can be inclined, for example, by an angle of 15° to the flat end face sections.

To allow a collapsing, radially deforming nail to escape, the rear end of the guide groove can open into a central recess which completely penetrates the movable guide element radially to the firing channel axis and separates two rearwardly projecting, mutually opposite webs. In particular, the central recess can be used to remove wood fibers that are released when a nail collapses, so that a subsequent nail can be driven in directly afterwards without prior cleaning of the free end of the firing channel and the movable guide element. The width of the recess can be based on the diameter of the nail, in particular be larger than the diameter of the nail to be driven in and/or be about 6 mm. A rounding can be provided at the transition to the two webs projecting to the rear.

In a further embodiment of the movable guide element, the two webs can project backwards by different distance. On both sides of the guide groove, inlet contours can be provided in the transition to the webs, which are preferably designed differently on both sides of the guide groove. In tests, it has been found that the asymmetry of the design of the webs and the inlet contours means that the firing pin cannot collide unfavorably with the movable guide element when it slips off the nail head and can be damaged there if the nail collapses. Due to the geometric asymmetry of the movable guide element in the area of the webs and the inlet chamfers, damage to the various components can be reliably prevented.

Specifically, on one side the inlet contour can be stepped and comprise a front inlet slope and a rear inlet slope inclined outwards relative thereto. The front inlet slope is preferably inclined at an angle of at least 20° and at most 40°, preferably 30°, to the inner end face, and the rear inlet slope is inclined at an angle of at least 50° and at most 70°, preferably 60°, to the inner end face. Such a stepped inlet contour on one side of the guide groove allows high radial forces of a collapsing wooden nail to be efficiently absorbed. At the same time, the mechanical stresses on the firing pin and the barrel are minimized and plastic deformation of the components is avoided.

For the same purpose, the transition between the front and rear inlet slopes can be rounded, the rounding preferably having a radius of about 4 millimeters. Such a rounding between the two inlet slopes prevents a sharp-edged transition and thus the risk of material blocking.

The front inlet slope and the rear inlet slope, as well as a rounding formed therebetween, can also extend at least partially into the region of the central recess and form a transition between the guide groove and the central recess.

In a further embodiment of the movable guide element, the inlet contour on one side of the guide groove can be designed in a single step as an inlet chamfer and can be inclined by an angle of at least 10° and at most 20°, preferably by 15°, to the inner end face. It is thus possible for one inlet contour to have a multi-stage design and the other inlet contour to have only a single-stage design as an inlet chamfer. Such asymmetry means that damage to the firing pin and other components can be reliably prevented if a nail collapses and forces acting radially to the firing channel axis occur.

In a further embodiment of this embodiment, the web may be rounded backward adjacent to the inlet chamfer and have the contour of a partial section of an arc of a circle.

In a similar way to the movable guide element, the stationary guide element can also have a linearly extending guide groove for guiding a nail to be driven in and a firing pin in an inner end face facing the firing channel axis in the installed state. The guide groove preferably has a semicircular cross section. The cross section of the guide groove is preferably adapted to the diameter of the nails to be driven in. In particular, it is intended that the cross section is adapted in such a way that a nail to be driven in is guided tightly, i.e. with little play or without play.

Flat end face sections can be arranged on both sides of the guide groove. At the rear end of at least one end face section, transition slopes can be formed, whereby a safe feeding of the nails and the impact bolt is achieved. In particular, a transition slope can be provided on only one side of the guide groove, which is inclined at an angle of at least 10 and at most 50, preferably at an angle of about 30° to the adjacent flat end face section.

Furthermore, the stationary guide element can comprise a rearwardly projecting guide protrusion over which the guide groove extends. The guide protrusion can be rounded and/or beveled at its rear free end. The guide protrusion, on which a part of the guide groove is formed, enables the guide groove to extend over almost the entire axial length of the open front end section of the barrel in the installed state.

The stationary guide element can further comprise a central recess, which is preferably open to the rear and to the outside. The guide rail can engage in this central recess in the assembled state. Furthermore, the retaining bore can be arranged in the region of this recess.

In a rear and/or radially outer section of the stationary guide element, a contact face can be formed which can be brought into contact with a corresponding stop face of a nail setting device or a basic body in order to firmly position the stationary guide element on the nail setting device or on the basic body. Since the stationary guide element must be immovably attachable to the nail setting device or to the basic body of a kit for retrofitting a guide element to a nail setting device, a bearing with a bolt is not sufficient. According to this embodiment, it is provided that additionally a contact face of the stationary guide element is brought into contact or abuts against a corresponding stop face, so that the stationary guide element is clearly and firmly positioned by the bolt or the screw and by the contact of the two surfaces against each other.

The problem underlying the invention is also solved by an arrangement of the type mentioned above comprising a nail setting device as described above and a movable guide element as described above attached thereto, so that the movable guide element can be moved between a radially inner guide position relative to the firing channel axis, in which it partially closes the front end section of the barrel and guides a firing pin driving a nail along the firing channel axis, and a radially outer deflection position in which radial deflection of a nail to be driven in is possible, about a pivot axis relative to the base body.

In a kit for retrofitting a guide element to a nail setting device, comprising a basic body and a movable guide element attached thereto each as previously described, it is provided in accordance with the invention that the movable guide element is pivotable about a pivot axis relative to the basic body between a guide position and a deflection position so as to be adapted to partially close the open front end portion of the barrel of a nail setting device and to allow radial deflection of a nail to be driven.

The arrangement according to the invention can be designed in such a way that the counter surface of the movable guide element can be brought into contact with a stop face of the base body in order to limit the movement of the movable guide element in the direction of its guide position. Accordingly, in the kit according to the invention, the counter surface of the movable guide element can be brought into contact with a stop face of the basic body.

Preferably, the fastening means are arranged at an inner end region of the guide rail of the nail setting device, or of the basic body, so that the guide rail can engage into the central recess of the movable guide element. Expediently, the bearing bore can also be arranged in the region of the central recess of the movable guide element.

The arrangement or kit may be configured such that a bolt or screw passes through the bearing bore of the movable guide element and the fastening bore of the nail setting device or base body, respectively, to pivotably mount the movable guide element relative to the base body of the nail setting device or basic body, respectively. Furthermore, securing means may be provided to secure the bolt or screw in the hole formed in the fastening bore or bearing bore, the securing means preferably comprising a locking ring or a nut, in particular a hexagonal nut. Such a locking ring can, for example, be designed in such a way that it can only be removed from the bolt by means of a tool. It is conceivable that the locking ring engages in a corresponding groove formed in the bolt. This can ensure that only users who have a corresponding tool can replace the corresponding guide element on a nail setting device or a basic body of a kit. Alternatively, the securing means can also comprise a bolt which is secured against unintentional loosening, for example by a nut, in particular a hexagon nut.

Furthermore, biasing means can be provided to bias the movable guide element in the direction of its guide position. Specifically, the biasing means can comprise a compression spring, in particular a helical compression spring, which is supported between the base body of the nail setting device, in particular a forwardly projecting protrusion of the base body, or the basic body of the kit, and a section of the movable guide element located axially in front of the pivot axis. This embodiment is based on the consideration that the movable guide element should basically be in its guide position and should independently return to the guide position after a movement out of the guide position due to a collapsing nail. On the other hand, a preload in the direction of the guide position ensures that the nail to be driven in and the firing pin are guided and that, when radial forces occur, a defined deflection of the guide element against the restoring force of the compression spring takes place. At the same time, this ensures that after the unsuccessful driving in of a collapsed nail and the associated movement of the guide element out of its guide position, the movable guide element automatically returns to its guide position before the next nail is driven in.

To prevent buckling of the compression spring, blind holes can be provided in the nail setting device, in particular in the base body of the nail setting device, or the basic body of a kit and the movable guide element, in which the compression spring engages or can engage. Alternatively or additionally, if it is a helical compression spring, a guide pin, for example made of hard rubber, can be inserted in its inner region to prevent it from buckling.

Furthermore, an arrangement comprising a nail setting device as described above with a stationary guide element immovably attached thereto as described above is also conceivable. Similarly, a kit comprising a basic body and a stationary guide element attached thereto, each as described above, can also be provided in accordance with the invention.

The problem underlying the invention is further solved by a nail setting device with a kit attached thereto as previously described.

Furthermore, the task underlying the invention is solved by a system of the type mentioned above, comprising a nail setting device, a movable guide element and a stationary guide element, each as described above. Furthermore, the problem is solved by a retrofit system comprising a basic body of a kit for retrofitting a guide element to a nail setting device, a movable guide element and a stationary guide element, each as described above, so that a user can selectively detachably attach a movable guide element or a stationary guide element to the nail setting device or to the basic body, respectively.

This embodiment is based on the idea of providing the user with two different guide elements, namely a stationary and a movable guide element. Depending on the general conditions, in particular the length of the nails to be driven, the user can then choose between one of the two guide elements and detachably attach it to a nail setting device or to a corresponding kit.

The system or the retrofit system, may further include a bolt or screw that may penetrate the fastening bore of the nail setting device or of the basic body, and the bearing bore of a movable guide element to pivotably mount the movable guide element relative to the base body. Similarly, said bolt or screw may extend through the fastening bore and the retaining bore of a stationary guide element to releasably secure the stationary guide element immovably to the base body of the nail setting tool or to the basic body of a kit. In other words, selective fastening of a movable or stationary guide element can be accomplished by aligning the corresponding holes and inserting a bolt or screw.

Securing means can be provided to prevent unintentional movement of the bolt or screw out of the corresponding bores. In the case of a bolt, these can include a locking ring which prevents unintentional movement of the bolt within the bores.

The system may further comprise biasing means for biasing the movable guide element in the direction of its guide position. Specifically, the biasing means may comprise a compression spring, in particular a helical compression spring, which may be supported between the base body of the nail setting device, in particular a forwardly projecting projection of the basic body, or the base body of the kit, and a region of the movable guide element axially forward of the pivot axis.

The individual components of the system or the retrofit system can be designed in such a way that a counter surface of the movable guide element can be brought into contact with a stop face of the nail setting device or the basic body in order to limit the movement of the movable guide element in the direction of its guide position. Furthermore, a contact face can be provided on the stationary guide element, which can be brought into abutment against a corresponding contact surface of the nail setting device or of the basic body, in order to position the stationary guide element clearly relative to the base body or base body.

Preferably, the fastening means are arranged at an inner end region of the guide rail of the nail setting device, or of the basic body, so that the guide rail can engage into the central recess of the movable guide element and/or of the stationary guide element. It is also expedient for the bearing bore to be arranged in the region of the central recess of the movable guide element or for the retaining bore to be arranged in the region of the central recess of the stationary guide element.

BRIEF DESCRIPTION OF THE DRAWINGS

For further embodiments of the invention, reference is made to the subclaims, as well as to the accompanying drawing. In the drawings show:

DETAILED DESCRIPTION OF THE PREFERRED EMBODIMENT(S)

Figure 1:
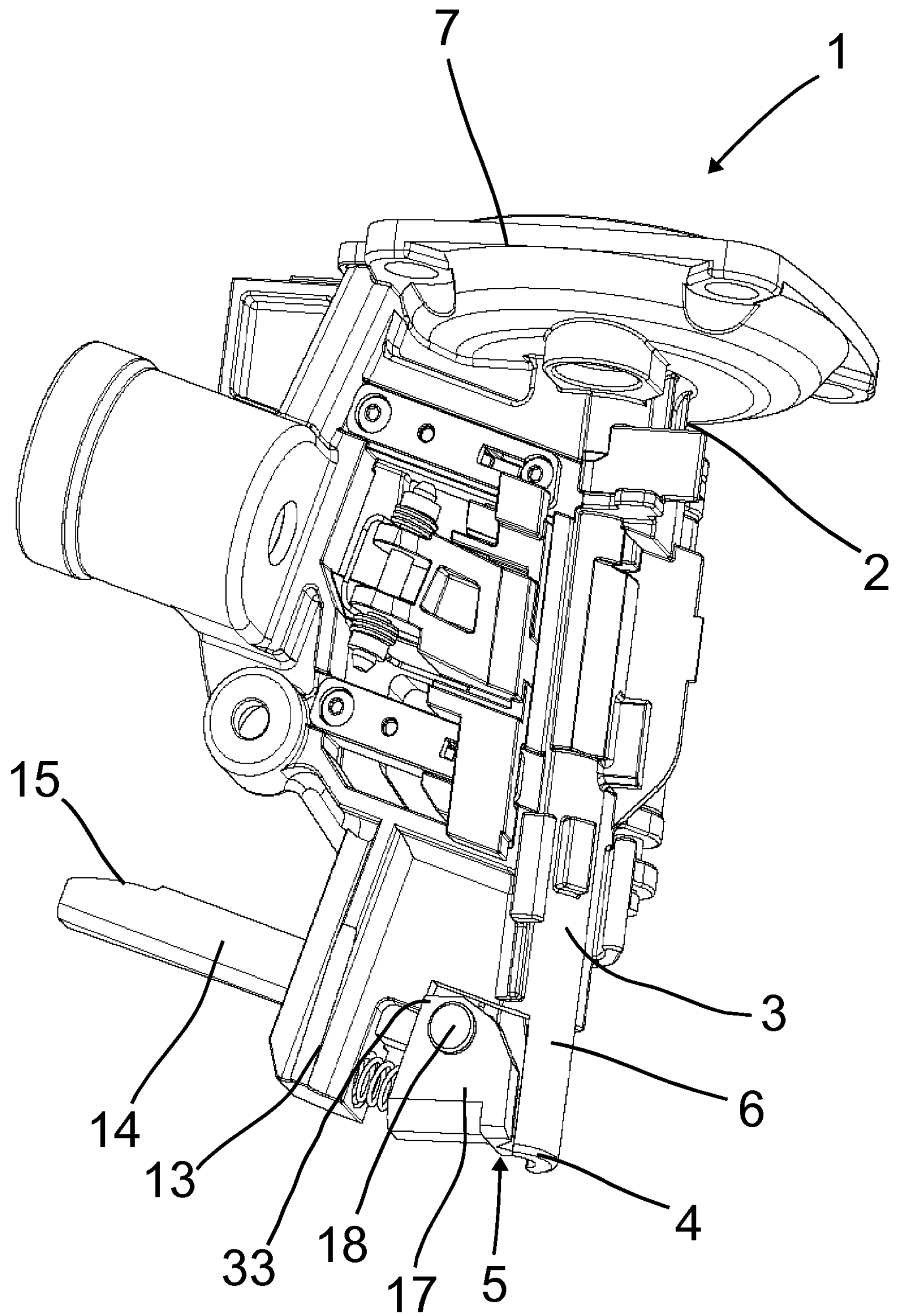
FIG. 1 an arrangement according to the invention with a device nose of a nail setting device in a perspective view with a mounted movable guide element.
Figure 2:
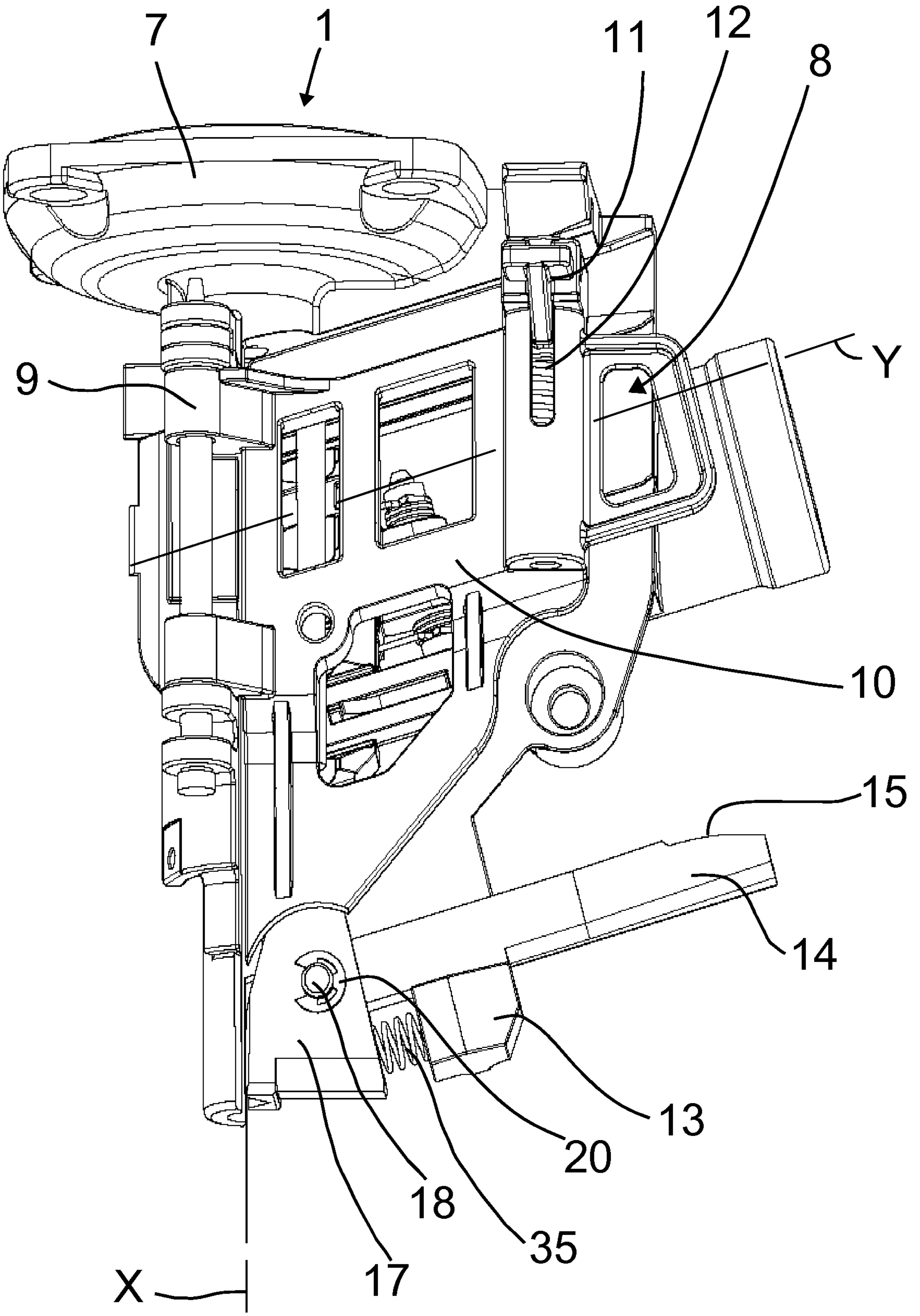
FIG. 2 a further perspective view of the device nose shown in FIG. 1.

FIGS. 1 and 2 show an arrangement according to the invention, which comprises a device nose 1 of a nail setting device for driving nails into workpieces to be joined.

The device nose 1 of the nail setting device has a base body 2 in the form of a casting, which comprises a barrel 3 for guiding a nail to be driven into a workpiece and a firing pin, not shown, which drives the nail. The barrel 3 extends between a front free end 4, via which the nail emerges when driven into a workpiece, and a rear end of the base body 2 on the drive side. On the inside, the barrel 3 forms a firing channel 5 along a firing channel axis X. The barrel 3 also has an open front end section 6 in which it surrounds the firing channel 5 over only a partial circumferential section of about 180°.

In order to apply compressed air to the firing channel 5 for driving the firing pin, the base body 2 is provided at its rear end with a flange 7 through which it is connected to a device for applying compressed air, which is not shown.

The device nose 1 of the nail setting device also has a feeding device 8 for nails, which defines a feeding axis Y. The feeding axis Y forms an acute angle of about 75° with the firing channel axis X towards the rear. Along the feeding axis Y, nails of a nail strip oriented parallel to one another can be fed one after the other to the firing channel 5. Specifically, the feeding device 8 comprises a door 10 pivotably connected to the base body 2 via a hinge 9. In FIG. 2, the door 10 is shown in a closed state and securely closed by a locking element 11 engaging positively in a corresponding contour of the base body 2. If a nail strip is to be inserted into the feeding device 8, the locking element 11 is moved forward from the position shown in FIG. 2 against the restoring force of a tension spring 12, so that the door 10 can be opened and a nail strip can be inserted into the feeding device 8 before the door 10 is closed again.

In a front end region of the base body 2, a guide rail 14 is provided on a forward-projecting protrusion 13, which extends parallel to the feeding axis Y and in front of it in order to support nails to be fed to the firing channel at their tip. Specifically, the guide rail 14 is formed integrally with the base body 2.

Figure 3:
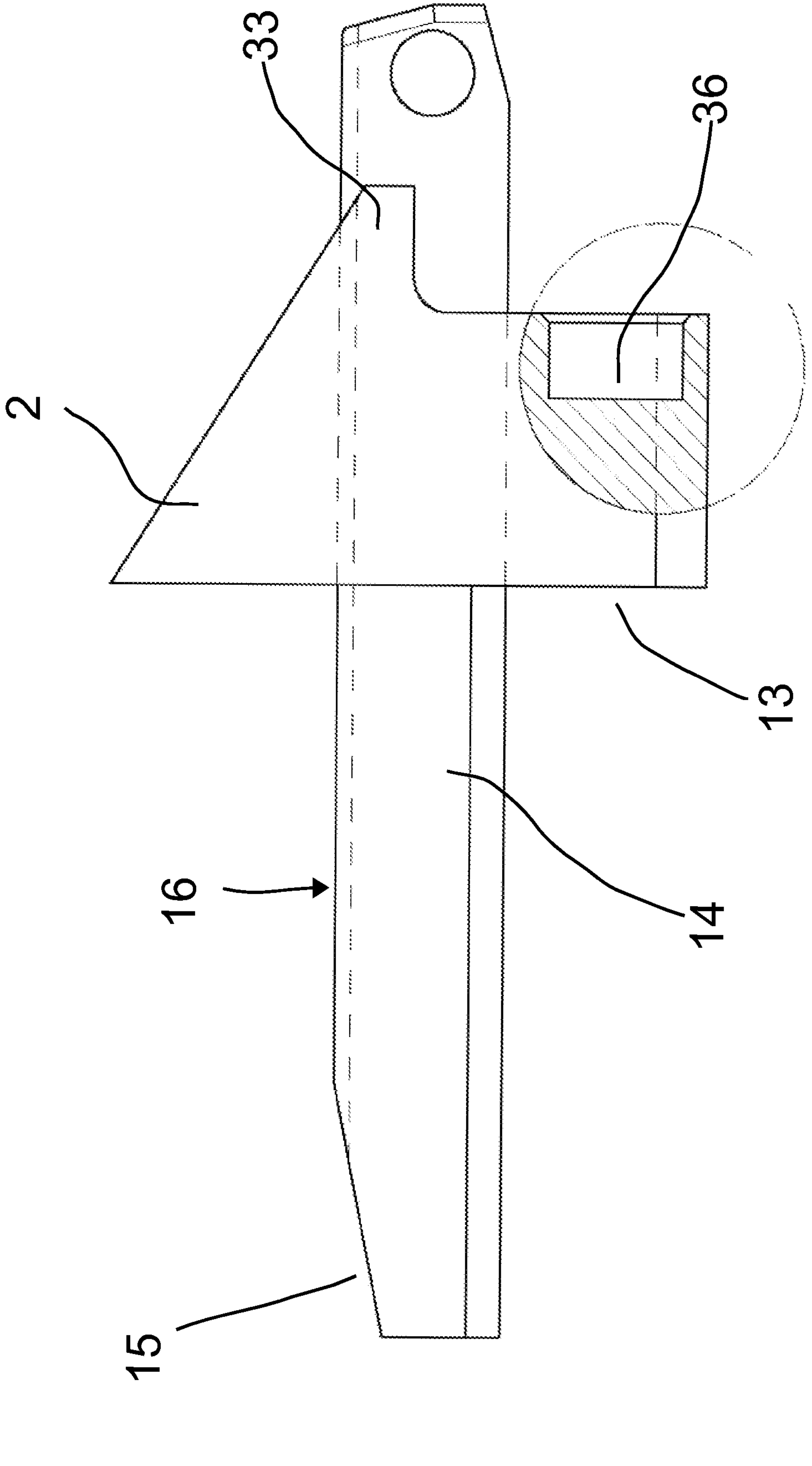
FIG. 3 a side view of the guide rail and part of the base body of the nail setting device shown in FIG. 1.
Figure 4:
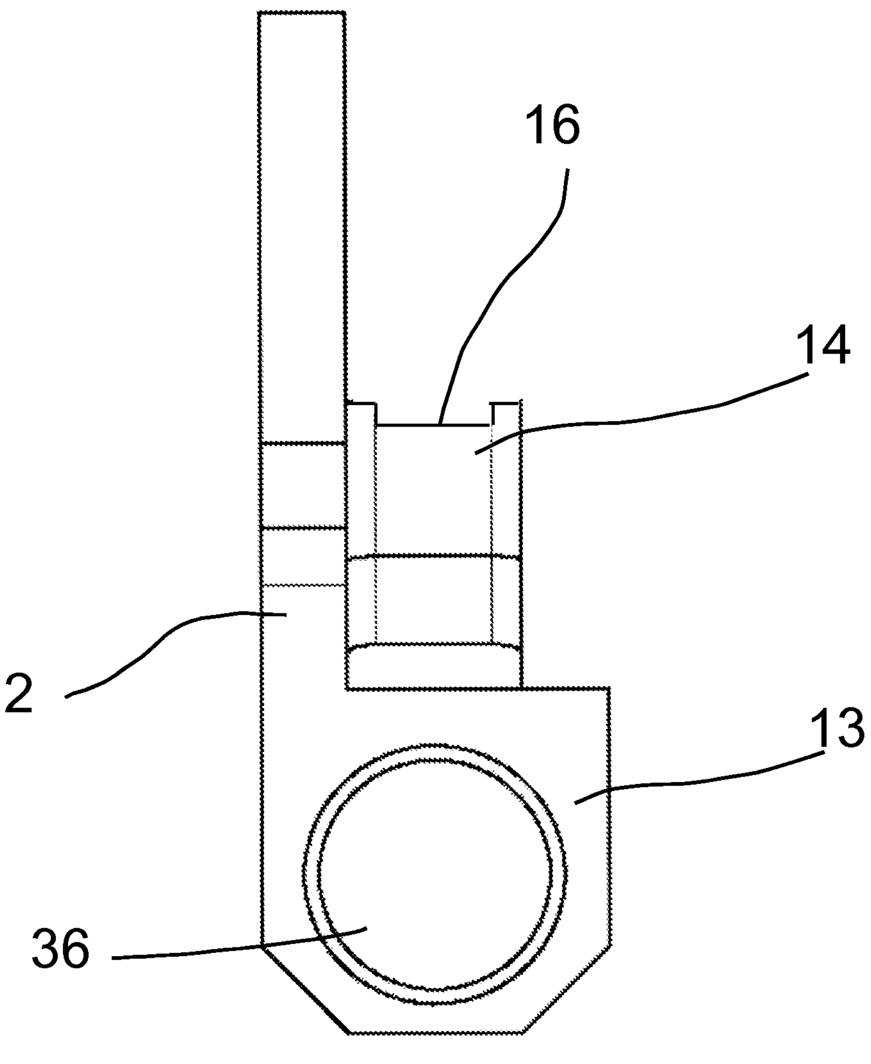
FIG. 4 the guide rail and the part of the base body from FIG. 3 in a view pointing radially outward with respect to the firing channel axis.
Figure 5:
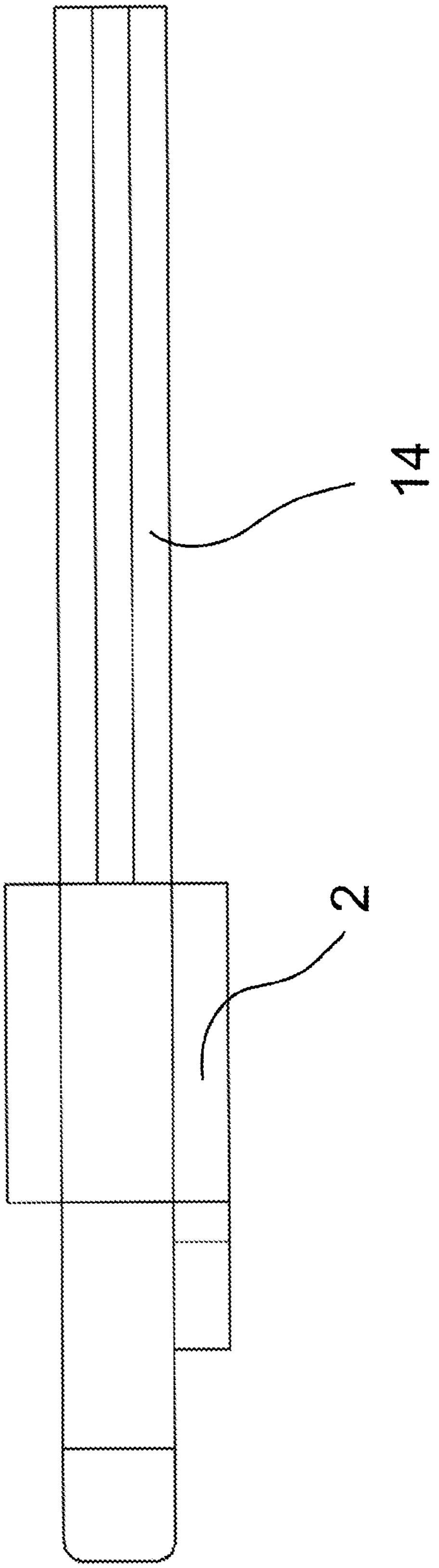
FIG. 5 a rear view of the guide rail and the part of the base body shown in FIG. 3.
Figure 6:
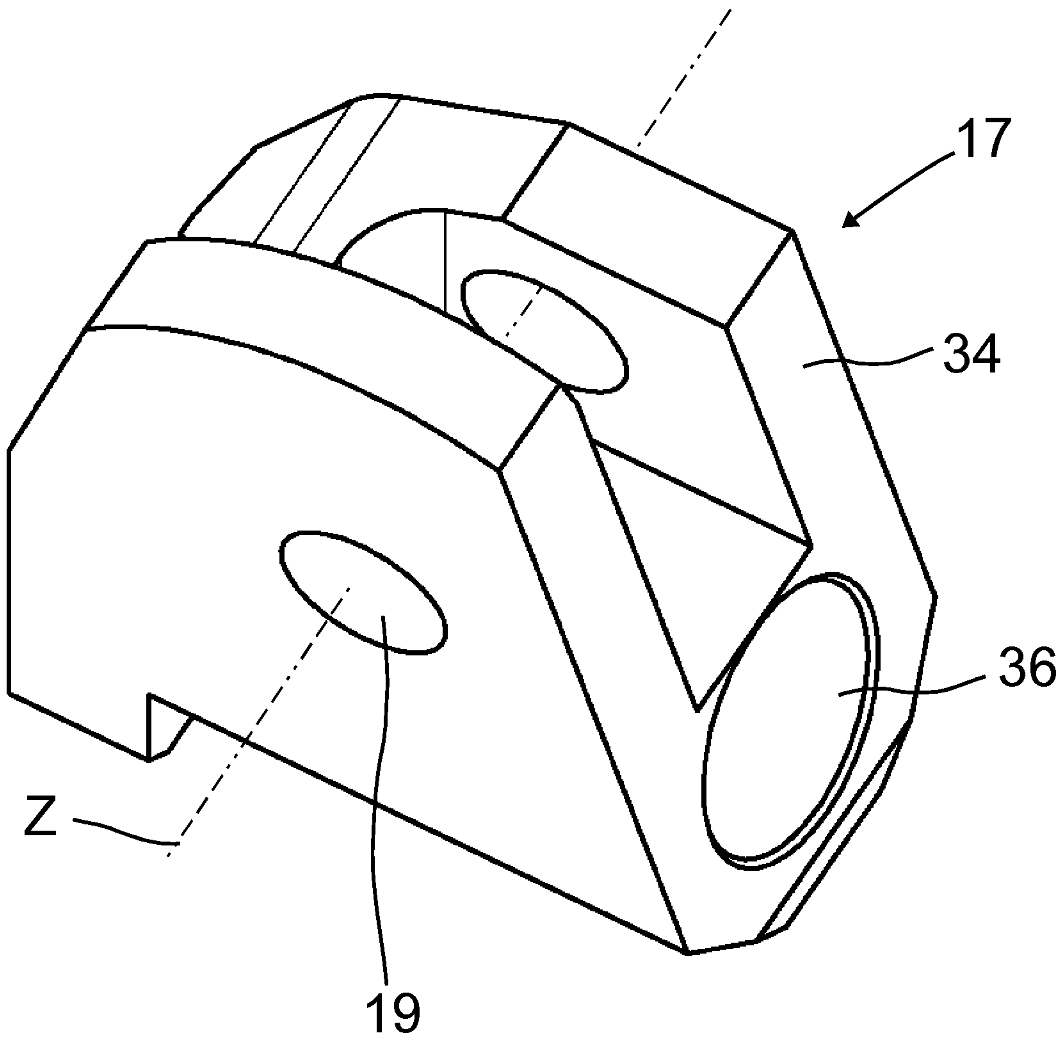
FIG. 6 a perspective view of the movable guide element of the arrangement shown in FIG. 1.
Figure 7:
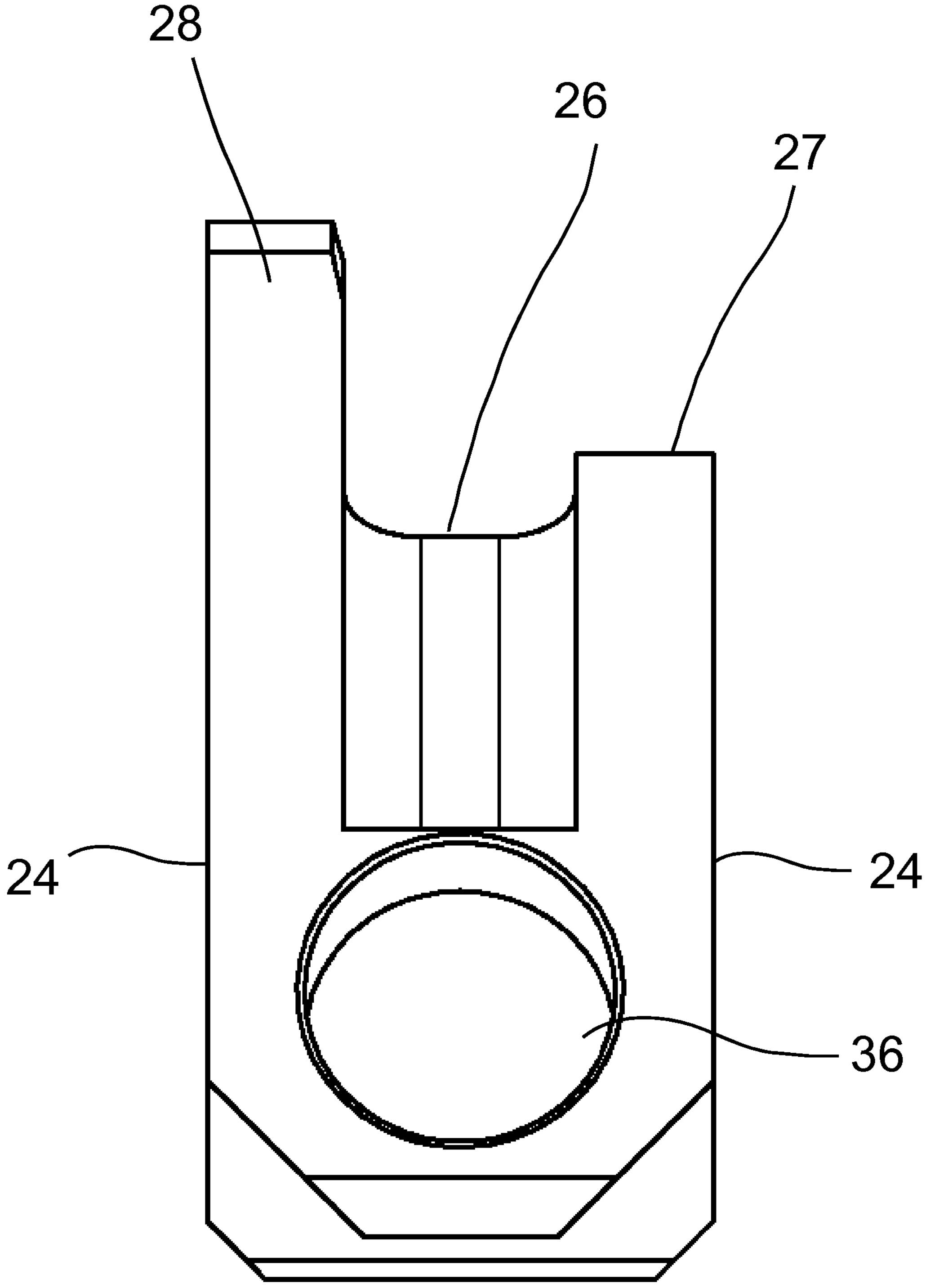
FIG. 7 the movable guide element of FIG. 6 in a view pointing radially inward with respect to the firing channel axis.
Figure 8:
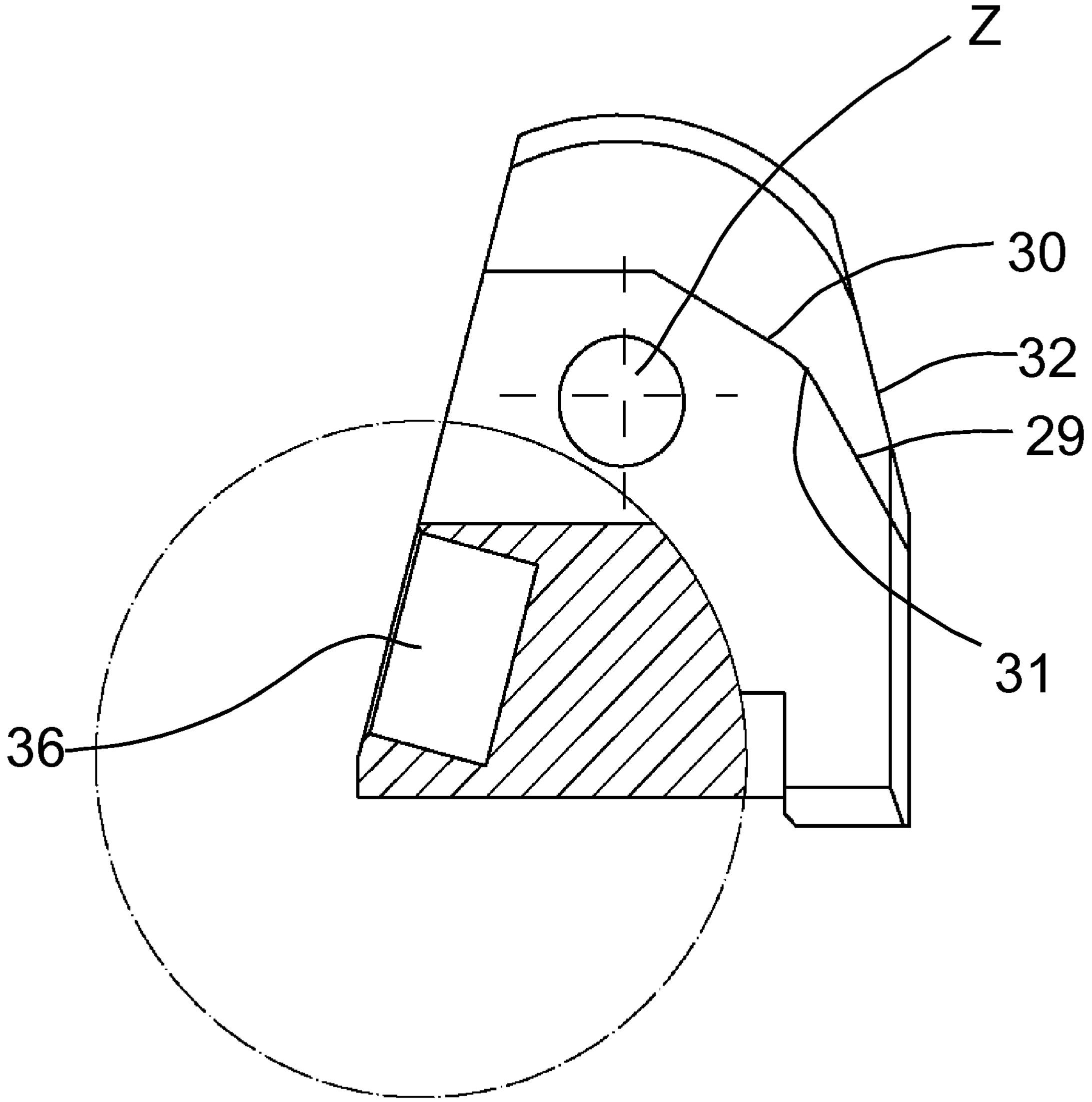
FIG. 8 a partially sectioned view of the movable guide element shown in FIG. 6.

FIGS. 3 to 5 show the guide rail 14 and the protrusion 13 of the base body 2 in detail. At its radially outer end region in relation to the firing channel axis X, the guide rail has a feeding slope 15 towards the top in order to move any nails that may have slipped in the nail strip back into their intended position. A longitudinal groove 16 is formed in the longitudinal direction of the guide rail 14 on its side facing rearwards towards the feeding axis Y. This groove has a rectangular cross-section, in order to support nails to be fed at their tip and to guide them along the feeding axis Y.

Fastening means are provided on an end section of the guide rail 14 located radially inward with regard to the firing channel axis X in order to mount a movable guide element 17 so that it can pivot about a pivot axis Z relative to the base body. Specifically, the fastening means comprise a fastening bore formed in the guide rail 14. The movable guide element is pivotably mounted by means of a bolt 18, which passes through a bearing bore 19 and the fastening bore along the pivot axis Z and is secured against unintentional release by a locking ring 20.

The guide element 17 can be pivoted between a radially inner guide position relative to the firing channel axis X, as shown in FIGS. 1 and 2, and a radially outer deflection position. In the guide position, the guide element 17 partially closes the open front end section 6 of the barrel 3 and guides a nail to be driven in and the firing pin driving it along the firing channel axis X. In the radially outer deflection position, radial deflection of a nail to be driven in is possible.

FIGS. 6 to 10 show the movable guide element as a single component in detail. In its inner end face 21 facing the firing channel axis X, the movable guide element 17 has a linearly extending guide groove 22 for guiding a nail to be driven in and the firing pin. For this purpose, the guide groove 22 has a V-shaped cross-section with an opening angle of 90.

On both sides of the guide groove 22—viewed from the groove center—a flat end face section 23 adjoins the guide groove 22 in each case, the two end face sections 23 lying in one plane. Further outwardly, at the transition to the side faces 24 bounding the guide element 17, chamfered slopes 25 follow, which are inclined at an angle of about 15° to the end surface sections 23.

The rear end of the guide groove 22 opens into a central recess 26, which completely penetrates the guide element 17 radially to the firing channel axis X and separates two rearwardly projecting, mutually opposite webs 27, 28. The central recess 26 has a width of about 6.5 mm and is rounded at the transition to the webs 27, 28, as can be seen in particular in FIG. 7. The guide rail 14 engages flush in the central recess 26 so that there is no significant gap between the guide rail 14 and the webs 27, 28.

Figure 9:
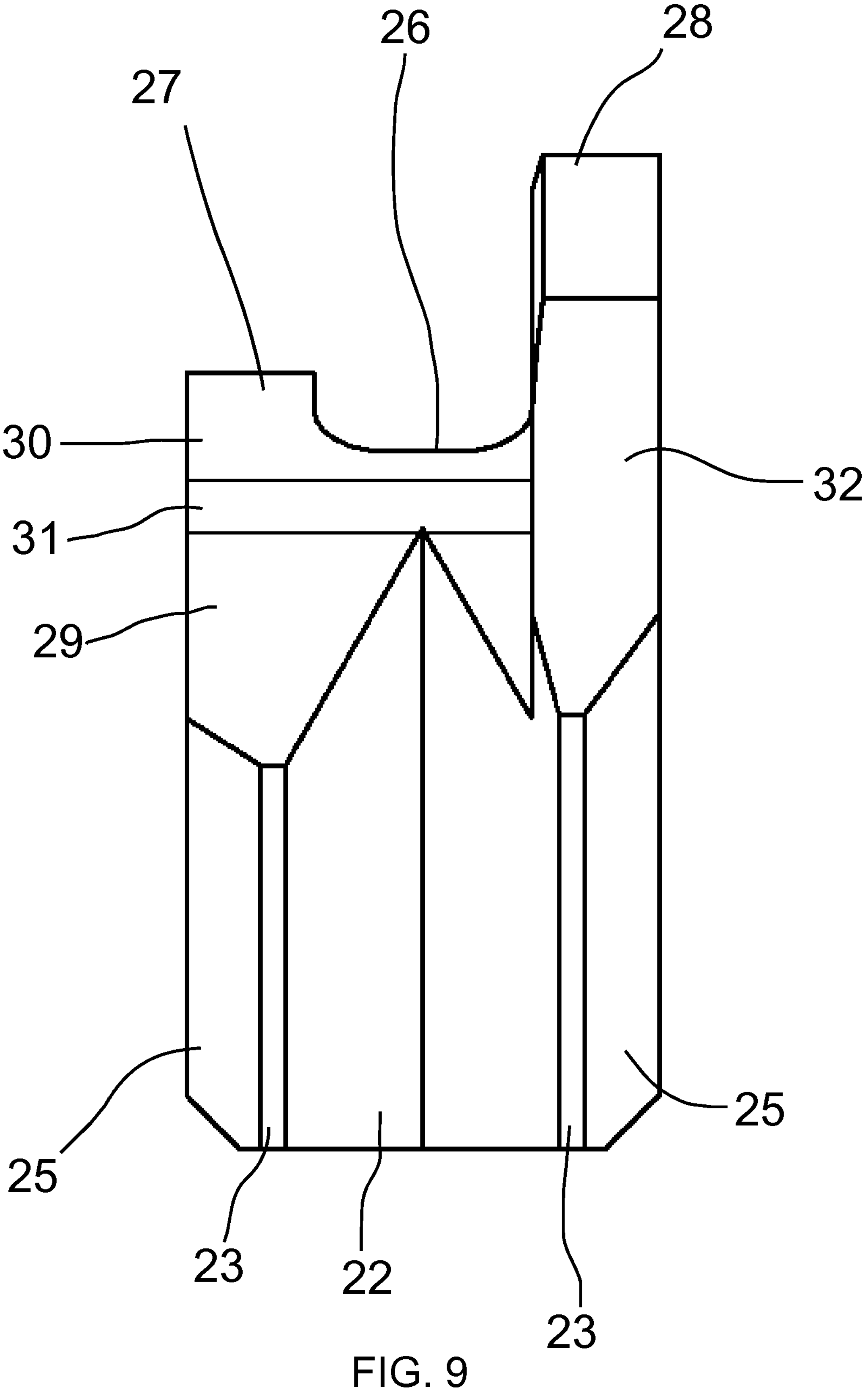
FIG. 9 the movable guide element of FIG. 6 in a view pointing radially outward with respect to the firing channel axis.
Figure 10:
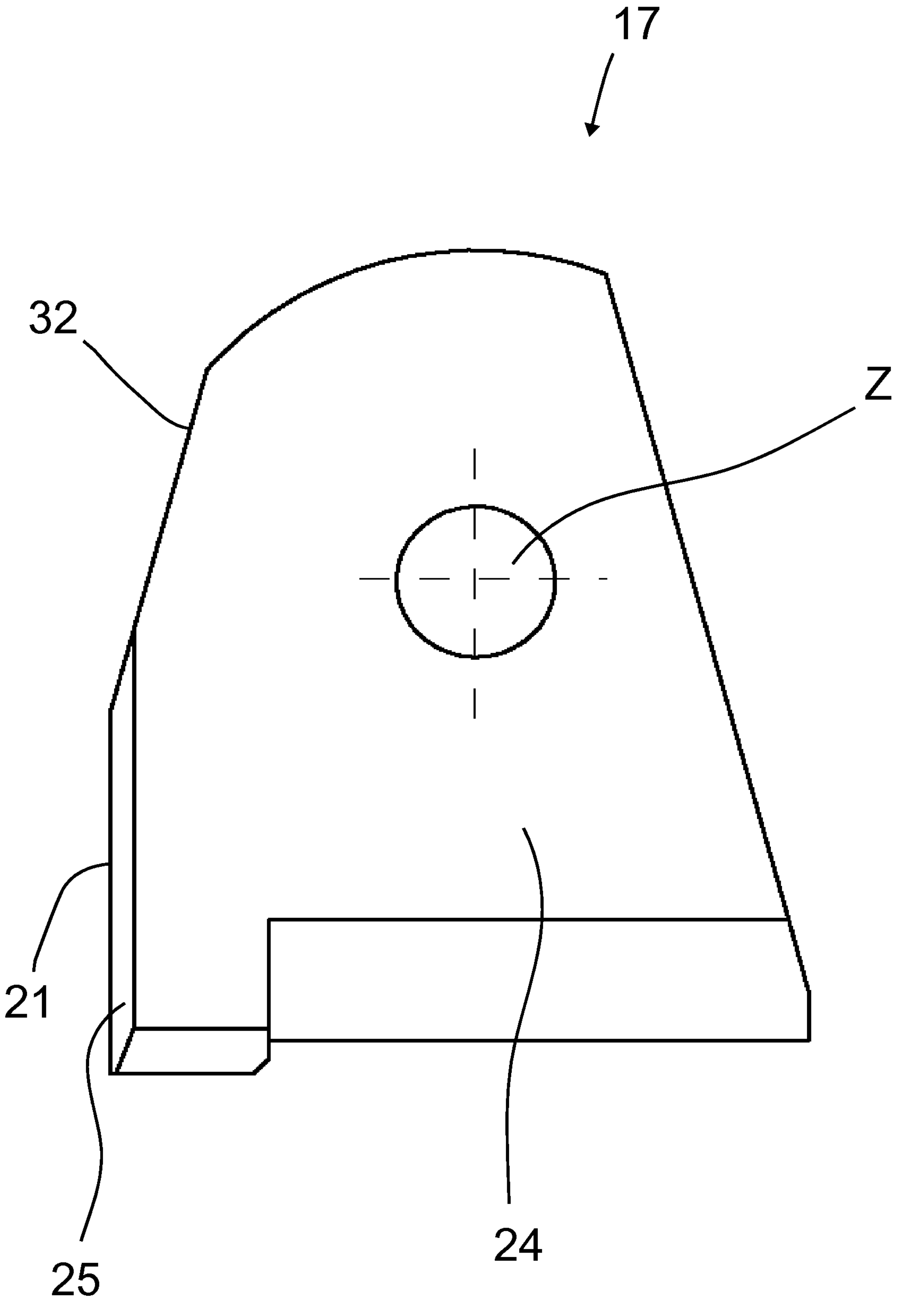
FIG. 10 a further side view of the movable guide element shown in FIG. 6.

The two webs 27, 28 project backwards differently from the central recess 26, with the web 27 arranged on the left in FIG. 9 projecting less backwards than the web 28 arranged on the right.

In order to prevent blocking of a nail to be driven in, inlet contours are provided on both sides of the guide groove 22 in the transition to the webs 27, 28, which inlet contour are designed differently. In the transition to the web 27, the inlet contour is stepped and comprises a front inlet slope 29, which is inclined at an angle of 30° to the inner end face, and a rear inlet slope 30, which is inclined outwards relative to the latter and is inclined at an angle of 60° to the inner end face. A rounding 31 is formed between the front inlet slope 29 and the rear inlet slope 30, which rounding 31 has a radius of 4 mm. The front inlet slope 29, the rear inlet slope 30 and the rounding 31 arranged between them also form at least in part the transition from the guide groove 22 to the central recess 26.

On the other side, the inlet contour at the transition to the web 28 is formed in a single step as an inlet chamfer 32 and is inclined at an angle of 15° to the inner end face. Adjacent to the inlet chamfer 32, the web 28 is rounded towards the rear and has the contour of a partial section of a circular arc.

As can be seen in FIG. 1 and FIG. 2, stop means are provided to limit the movement of the guide element 17 in the direction of the guide position. Specifically, the stop means have a stop face 33 formed on the base body 2, which is located behind and radially outside of the pivot axis Z. The stop face 33 is located on the base body 2. A corresponding counter surface 34 of the guide element 17 rests against it.

Furthermore, biasing means are provided to bias the guide element 17 in the direction of its guide position. The biasing means comprise a helical compression spring 35, which is supported between the protrusion 13 of the base body 2 and a section of the guide element 17 lying axially in front of the pivot axis Z. The biasing means are provided in the protrusion 13 of the base body 2 and in the guide element 17. To prevent the helical compression spring 35 from buckling, blind holes 36 are provided in the protrusion 13 of the base body 2 and in the guide element 17, in which blind holes 36 the helical compression spring 35 engages.

Figure 11:
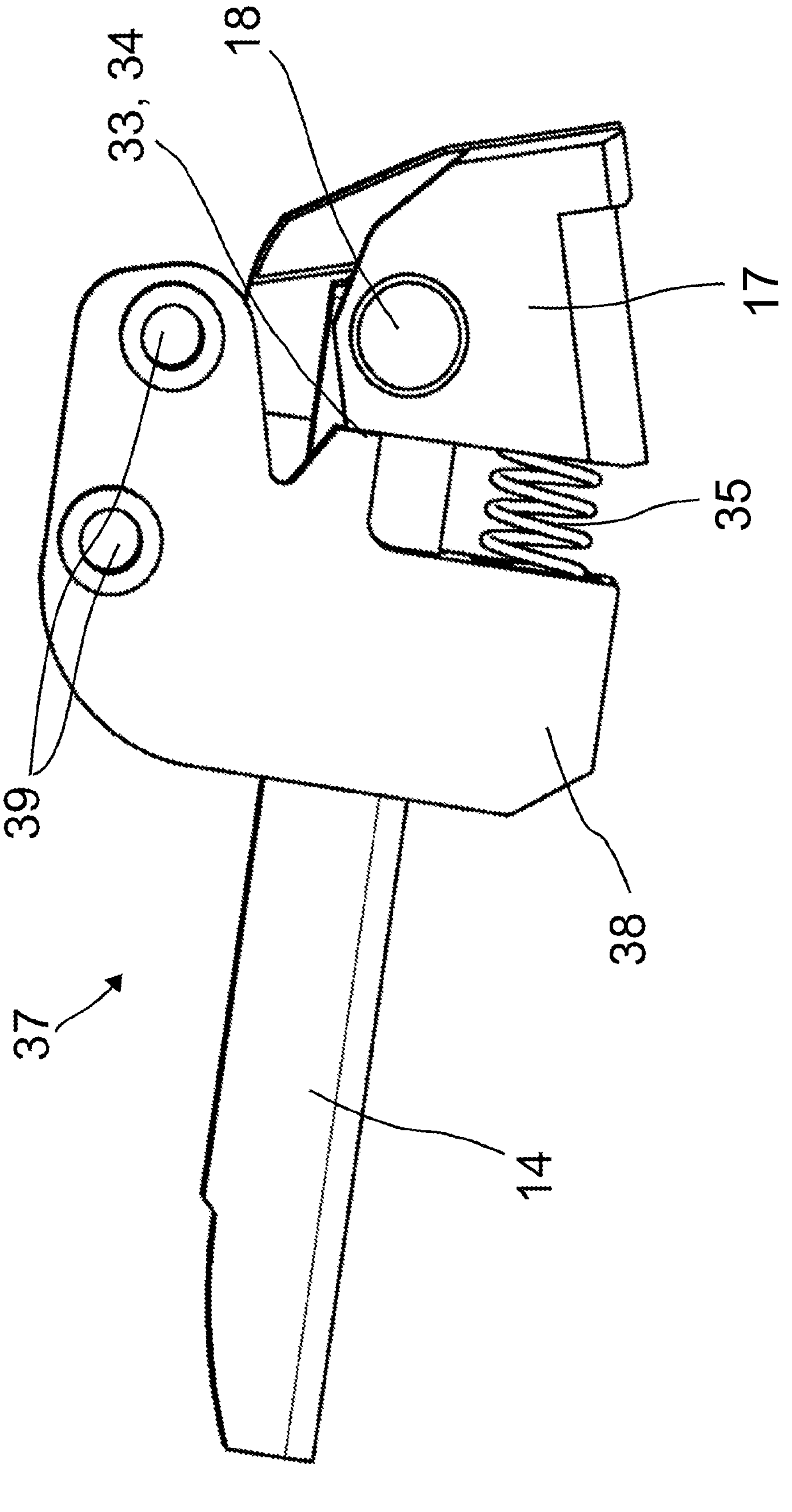
FIG. 11 a kit according to the present invention for attachment to a nail setting device in a perspective view.
Figure 12:
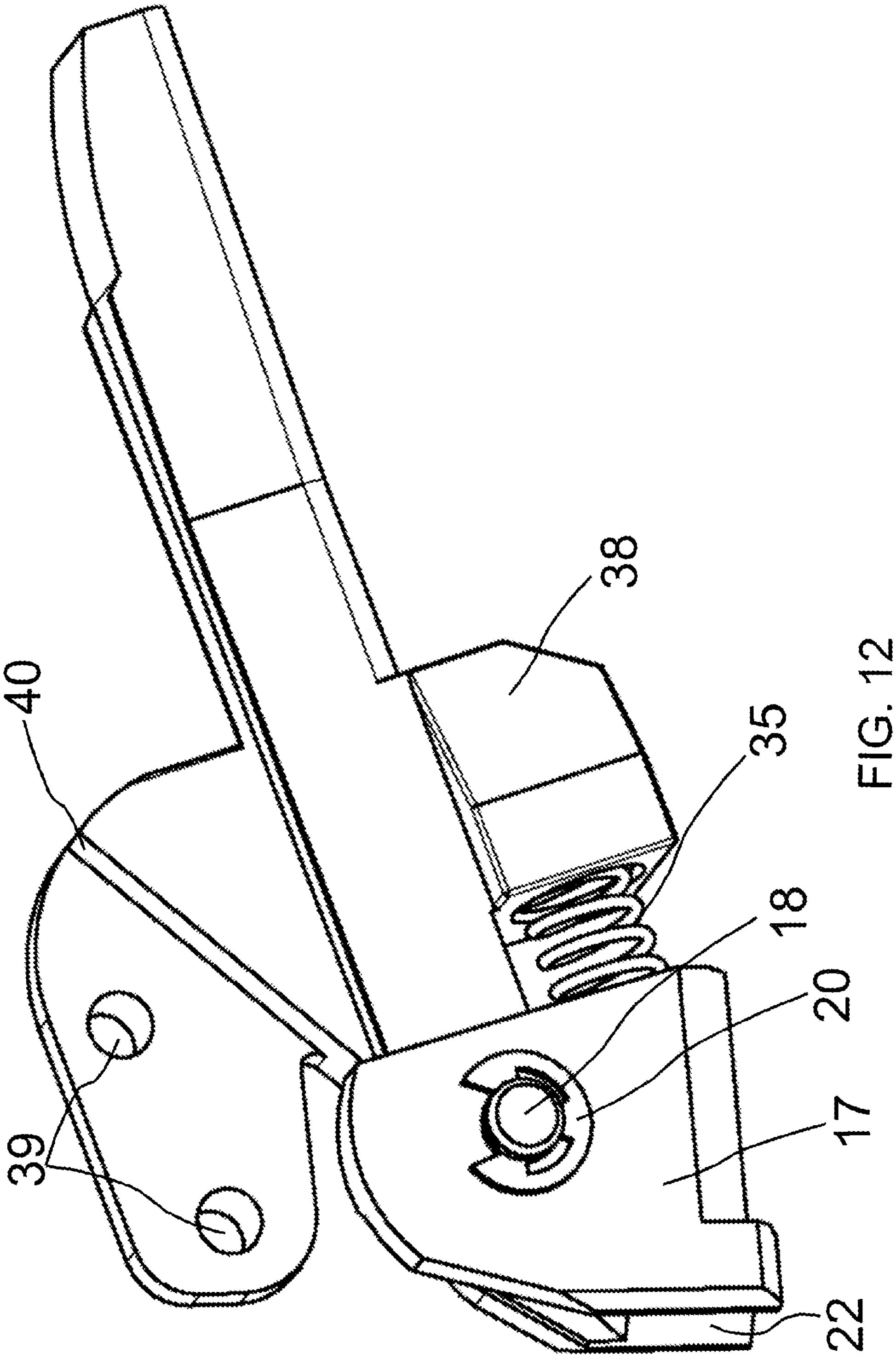
FIG. 12 the kit of FIG. 11 in a further perspective view.
Figure 13:
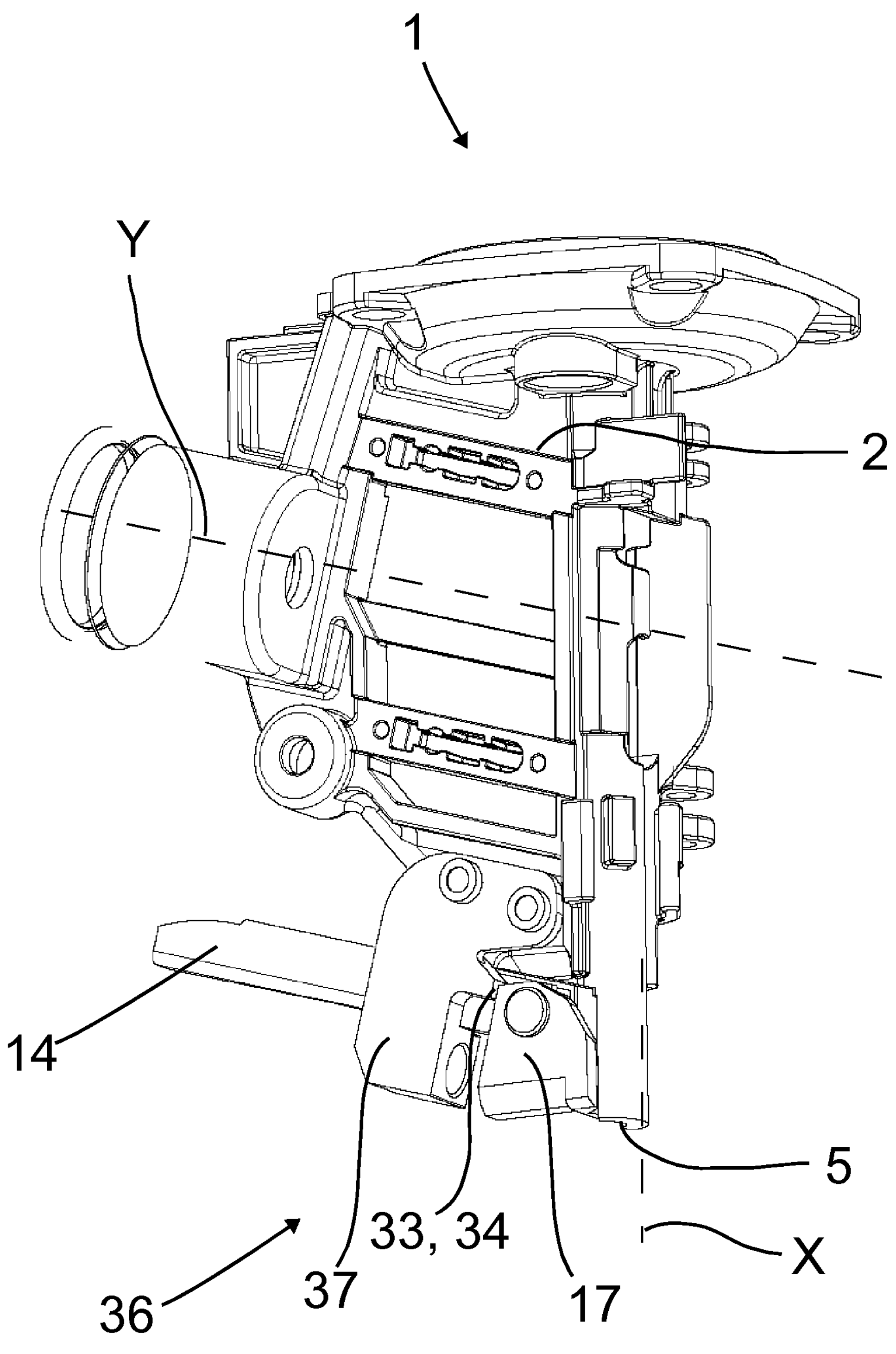
FIG. 13 a perspective view of the nose of a nail setting device with a kit of FIG. 11.
Figure 14:
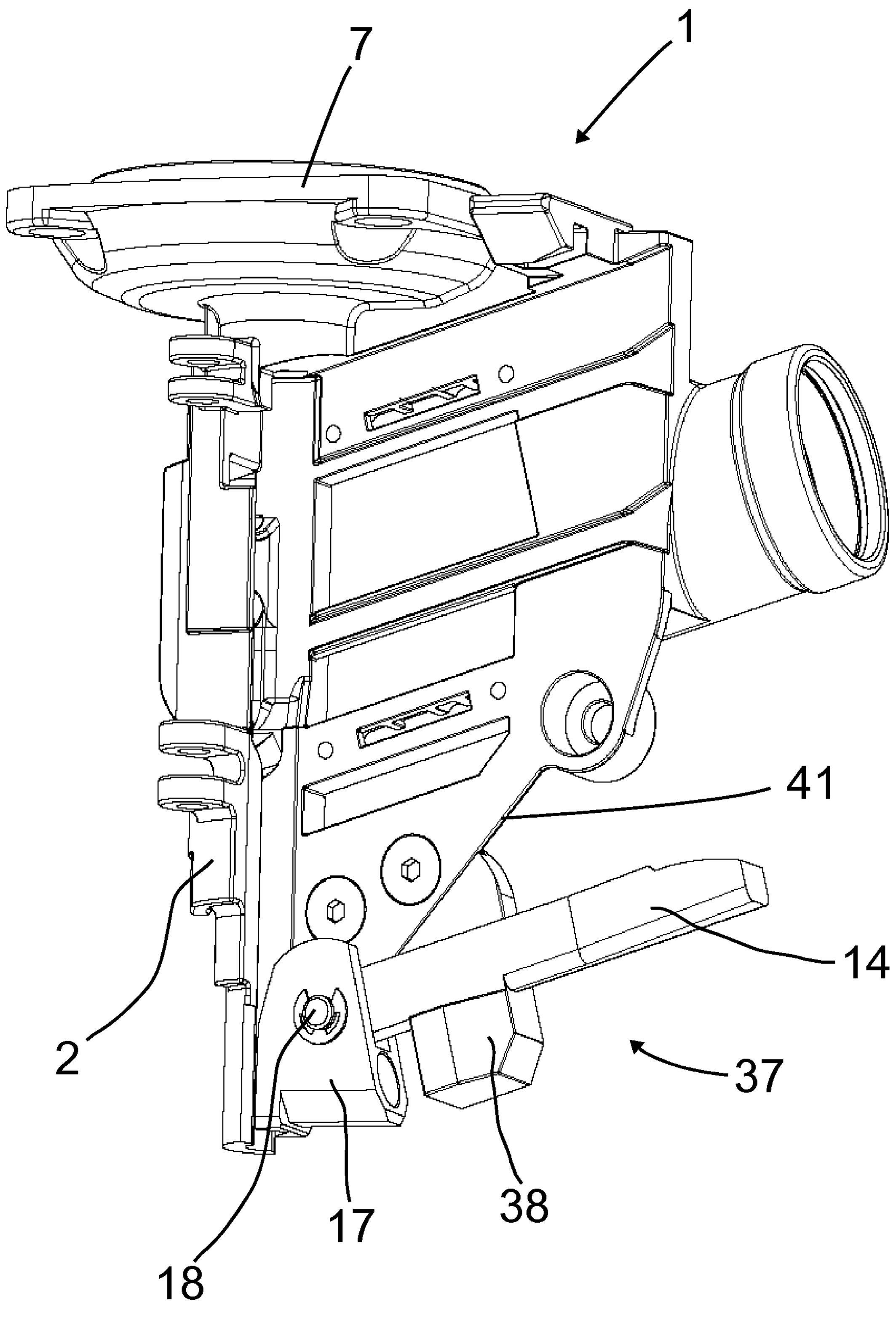
FIG. 14 another perspective view of the device nose shown in FIG. 13.

FIGS. 11 and 12 show a kit 37 according to the present invention for attachment to a nail setting device 1; FIGS. 13 and 14 show a device nose 1 of a nail setting device having such a kit 37.

The kit 37 makes it possible to retrofit an existing nail setting device with a guide rail 14 for guiding the nails to be fed and with a movable guide element 17 for guiding a nail to be driven and a firing pin.

The kit 37 comprises a basic body 38, which is designed to be attached to the base body 2 of a device nose of the nail setting device. Attachment means are provided for this purpose, which in the present case comprise threaded holes 39 formed in the basic body 38 for screwing onto the base body 2 of a device nose 1 of a nail setting device. For positioning the basic body 38 relative to the base body 2 of a nail setting device 1, a contact surface 40 is formed on the basic body 38, which contact surface can be brought into contact with a corresponding mating edge 41 of the base body 2 of the device nose 1 of a nail setting device, as shown in FIGS. 13 and 14.

A guide rail 14 is provided on the basic body 38 in the same way as on the protrusion 13 of the base body 2 of the device nose 1 of a nail setting device of FIGS. 1 to 10, in order to support the nails to be fed to the front. The guide rail 14 and the basic body 38 are formed in one piece.

Also in the same manner, a guide element 17, as shown in FIGS. 6 to 10, is pivotably mounted on the guide rail 14 between a guide position and a deflection position so as to be suitable for partially closing the open front end portion 6 of the barrel 3 and allowing radial deflection of a nail to be driven in.

Both in the device nose 1 of a nail setting device shown in FIGS. 1 and 2, in which the guide rail 14 is attached directly to the base body 2, and in the nail setting device 1 of FIGS. 13 and 14, which is provided with the kit 37 according to the invention, wooden nails are fed successively from a strip of nails to the barrel 3 by the feeding device 8.

The guide rail 14 and the longitudinal groove 16 formed therein, as well as the feeding slope 15, ensure that the wooden nails contained in the nail strip cannot slip, or that slipped wooden nails return to their correct position relative to the nail strip, so that a reliable and trouble-free feed of the nails towards the weft channel 5 is achieved.

If a wooden nail inserted into the firing channel 5 is to be driven into a workpiece, the front free end 4 of the barrel 3 is first placed on the workpiece. Then, by manual operation or automated, the firing channel 5 is pressurized with air pressure so that the firing pin drives the wooden nail in the direction of the front free end 4 of the barrel tube 3 along the shot channel axis X. The nail is then driven into the workpiece. The nail leaves the barrel 3 at a speed of about 25 m/s and penetrates a workpiece. In the process, the nail is guided by the guide element 17 in the region of the open front end section 6 of the barrel 3.

If the nail does not encounter a hard spot in the workpiece, it easily penetrates the workpiece completely without moving the guide element 17 out of the guide position and without the nail exerting radial forces on other components of the nail setting device, for example the firing pin or the guide element 17 or the barrel 3.

If, on the other hand, the nail to be driven encounters a hard spot in the workpiece, it fibers out due to the lack of ductility and collapses. This causes the nail cross-section to widen in the rear end region of the nail, so that considerable radial forces occur. In this case, the guide element 17 moves radially outward with respect to the firing channel axis X against the biasing force of the helical compression spring 35, thus allowing the nail to expand radially. In addition, the central recess 26 of the guide element 17 causes wood fibers of the nail to emerge laterally from the firing channel 5. Furthermore, the defined deflection of the guide element 17, in particular due to its asymmetrical design, intercepts the nail and the firing pin driving it without causing high mechanical stresses that could damage components of the device nose 1 of a nail setting device.

Even if a nail collapses by hitting a hard spot in the workpiece, the guide element 17 automatically returns to its guide position due to the restoring force of the helical compression spring 35, so that the next nail can be driven directly into the workpiece without the need for timeconsuming interference suppression work. The fact that the guide rail 14 engages in the central recess 26 of the guide element 17 without any appreciable play also means that no wood fibers can get stuck and block the movement of the guide element 17 relative to the base body 2.

Figure 15:
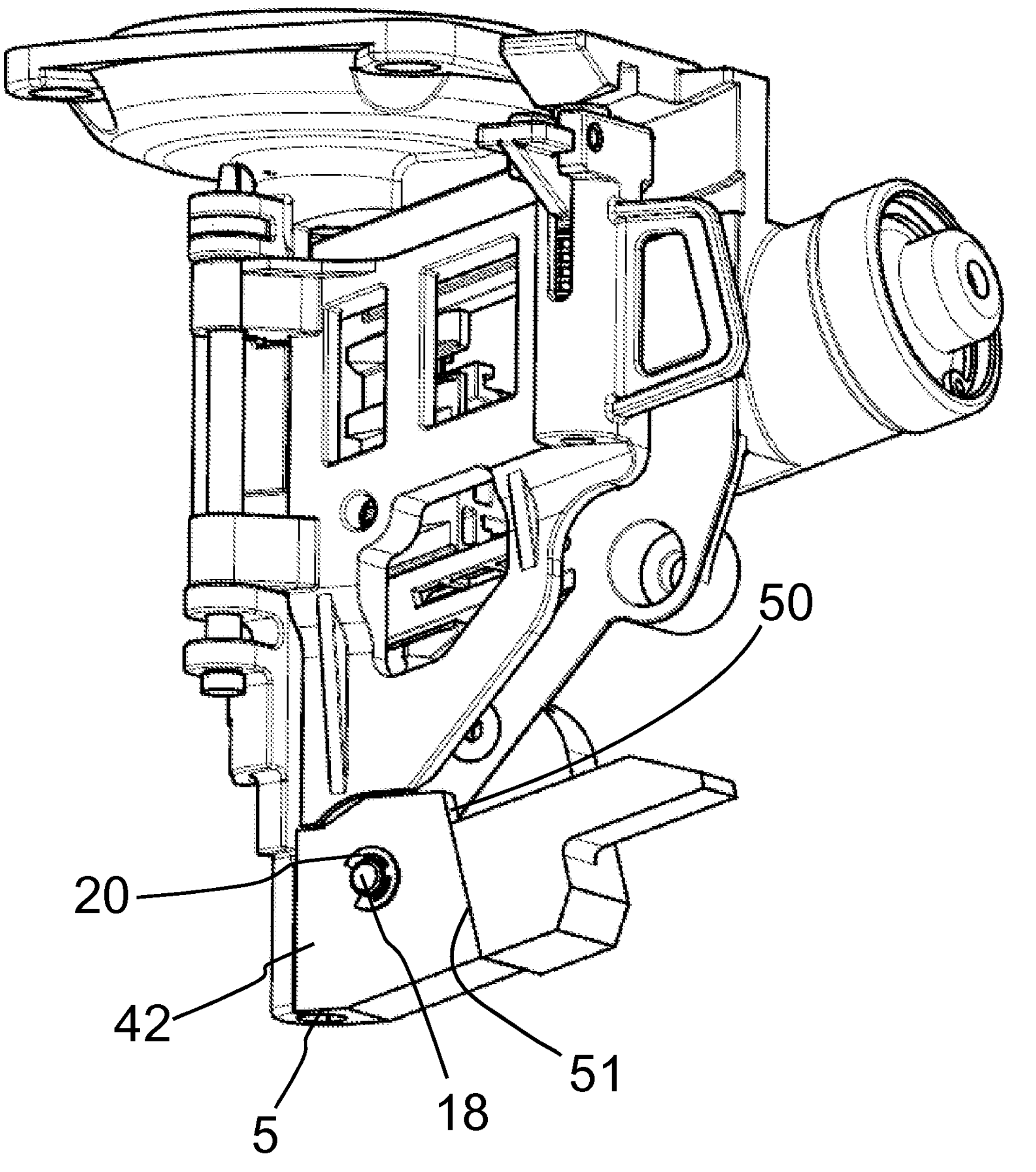
FIG. 15 the device nose of the nail setting device of FIGS. 13 and 14 with a kit, but with a mounted stationary guide element in a perspective view.
Figure 16:
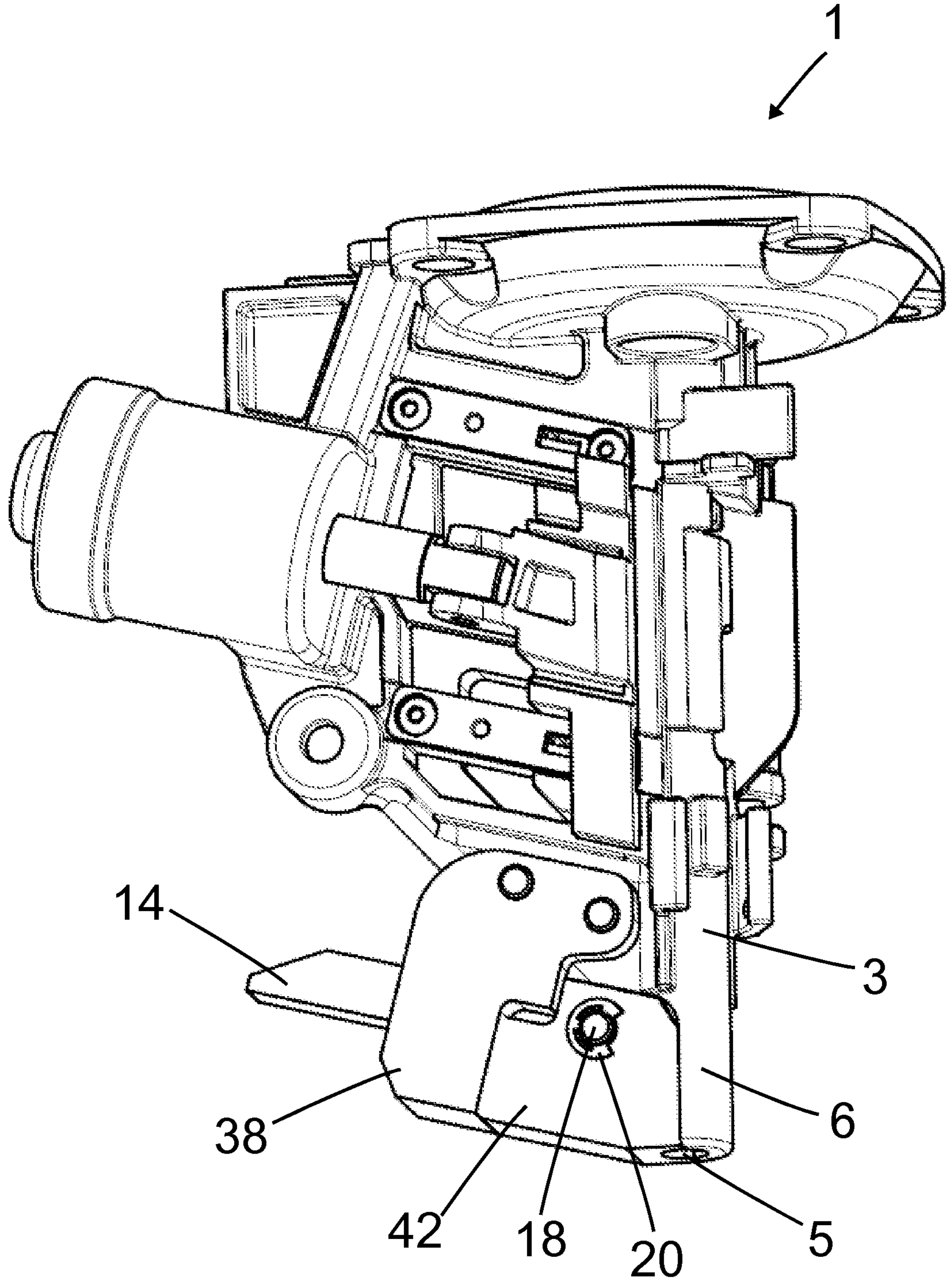
FIG. 16 another perspective view of the device nose shown in FIG. 15.

In the case of certain nails, in particular those with a short length, it has proved advantageous not to provide an option for spreading. Accordingly, FIGS. 15 and 16 show a device nose 1 of a nail setting device with a basic body 38 according to the invention, whereby, however, no movable guide element 17, but a stationary guide element 42 is attached to the basic body 38. FIGS. 17 and 18 again show the stationary guide element 42 as a separate component in detail.

The stationary guide element 42 has a linearly extending guide groove 44 with a semicircular cross-section in its inner end face 43 facing the firing channel axis X in the installed state. This serves to guide a nail to be driven in and the firing pin of the nail setting device 1. Flat end face sections 45 are arranged on both sides of the guide groove 44, the end face section 45 shown on the left in FIG. 18 opening at the top into a transitional slope 46. This slope 46 is inclined at an angle of about 30° to the flat end face section 45.

Figure 17:
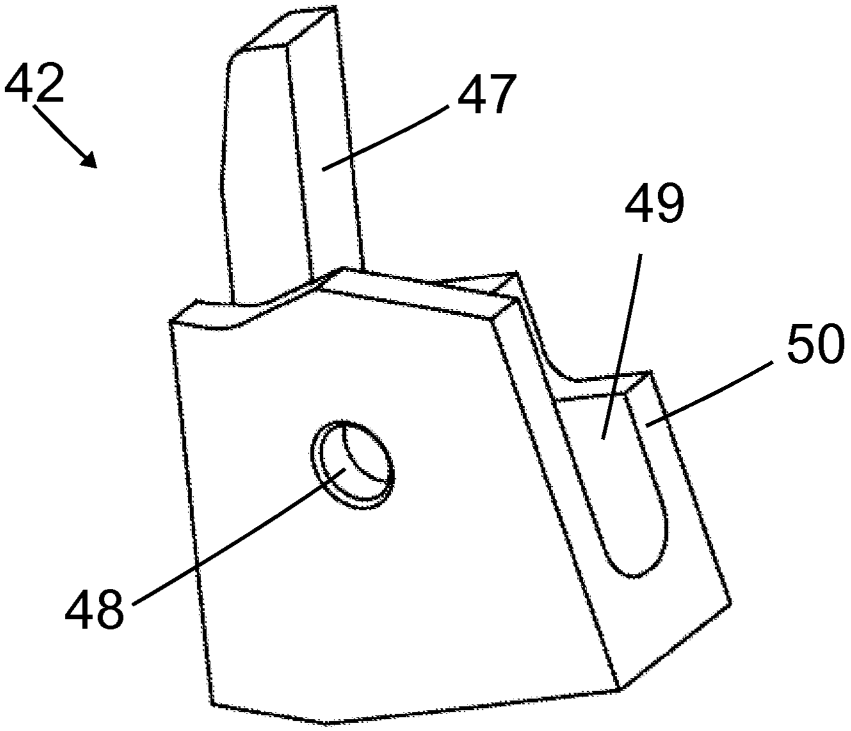
FIG. 17 a perspective view of the stationary guide element of FIGS. 15 and 16.
Figure 18:
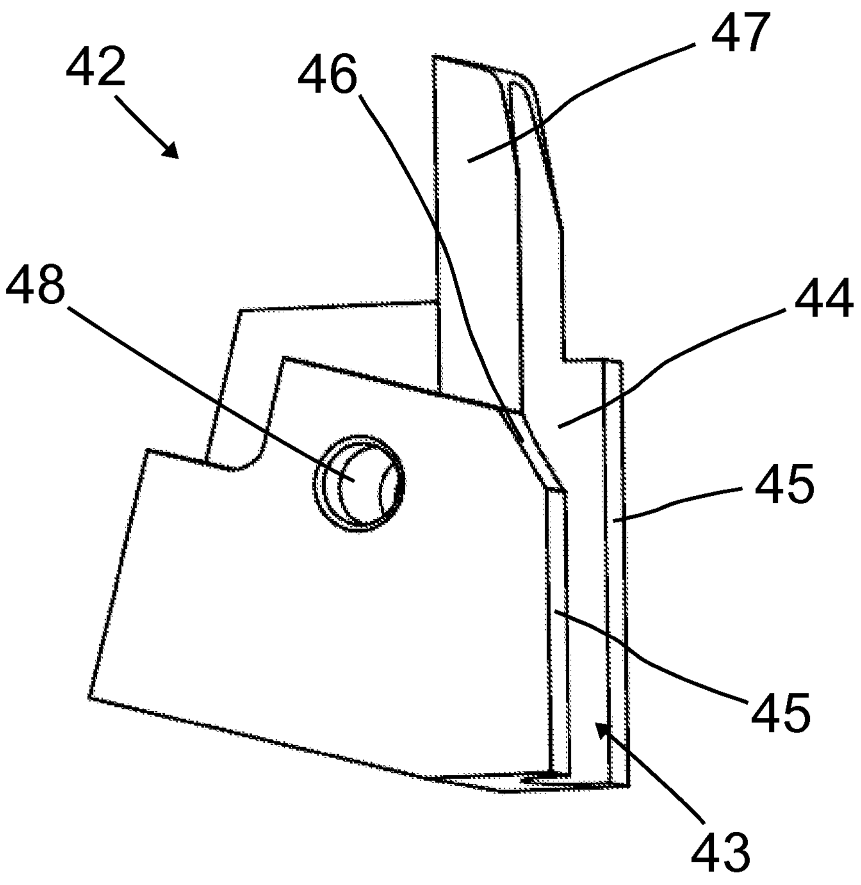
FIG. 18 shows the stationary guide element from FIG. 17 in a further perspective view.

As can be seen in particular in FIGS. 17 and 18, the guide groove 44 also extends over a rearwardly projecting guide groove protrusion 47 which is chamfered and rounded in its rear end region. Through this guide groove protrusion 47, the guide groove 44 extends substantially over the entire axial length of the open front end section 6 of the barrel 3.

The stationary guide element 42 further includes fixing means for releasably attaching the guide element 42 to the basic body 38 of the kit 37. Specifically, the fixing means comprise a retaining bore 48 that extends completely through the stationary guide element 42. In FIGS. 15 and 16, it can be seen that the stationary guide element 42 is releasably secured to the basic body 38. In this case, the bolt 18 completely penetrates the retaining bore 48 of the stationary guide element 42 and the fastening bore of the basic body 38 and is secured against unintentional loosening by means of the locking ring 20.

Furthermore, the stationary guide element 42 is provided with a central recess 49 which is open towards the rear and radially outwards and in which the guide rail 14 of the basic body 38 engages, so that a space-saving attachment of the stationary guide element 42 can be realized.

At its radially outer end, the stationary guide element 42 has a contact face 50 which can be brought into abutment with a corresponding second stop face 51 of the basic body 38 in order to firmly position the stationary guide element 42 on the basic body 38. In conjunction with the attachment via the retaining bore 48, the stationary guide element 42 is thus firmly positioned on the basic body 38 and thus relative to the base body 2 of the nail setting device, as can be seen in FIG. 15.

A user can thus optionally, i.e. depending on the type of nails to be driven in and depending on further general conditions, either attach a stationary guide element 42 or a movable guide element 17 to the nail setting device. To do this, he simply has to remove the locking ring 20 from the bolt 18 and pull the bolt 18 out of the corresponding holes. Replacement of the guide element 17, 41 is then possible without any problems. In this way, the nail setting device shown can be used universally and is suitable for various nails to be driven in, in particular those made of lignocellulosic material.

The invention claimed is:

1. A movable guide element configured to be attached to a nail setting device, the nail setting device having a base body comprising a barrel for guiding a nail to be driven into a work piece and a firing pin driving the nail, the barrel extending between a front free end, via which the nail emerges when being driven into a workpiece, and a rear end on a drive side, wherein the barrel internally has a firing channel along a firing channel axis and has an open front end section in which the open front end section surrounds the firing channel over only a partial circumferential portion, or to a basic body for a kit for retrofitting a guide element to the nail setting device, in such a way that the movable guide element is moveable between a radially inner guide position relative to the firing channel axis, in which the movable guide element partially closes the open front end section of the barrel and guides a nail to be driven in and the firing pin driving the nail along the firing channel axis, and a radially outer deflection position, in which radial deflection of the nail to be driven in is possible, about a pivot axis relative to the base body, wherein a linearly extending guide groove for guiding the nail to be driven in and the firing pin is in an inner end face facing the firing channel axis in an installed state, and wherein a rear end of the linearly extending guide groove opens into a central recess which completely penetrates the movable guide element from an inside to an outside and separates two rearwardly projecting, mutually opposite webs, wherein inlet contours are provided on both sides of the linearly extending guide groove in transition to the two webs, wherein on one side of the linearly extending guide groove the inlet contour is formed in a single step as an inlet chamfer and is inclined by an angle of at least 10° and at most 20° to the inner end face.

2. An arrangement, comprising:

a nail setting device including a base body comprising a barrel for guiding a nail to be driven into a work piece and a firing pin driving the nail, the barrel extending between a front free end, via which a nail emerges when being driven into a work piece, and a rear end of a drive side, the barrel internally has a firing channel axis and has an open front end section in which the open front end section surrounds the firing channel over only in partial circumferential portion; and a movable guide element according to claim 1 attached thereto, such that the movable guide element is movable between a radially inner guide position relative to the firing channel axis, in which the movable guide element partially closes the front end section of the barrel and guides a firing pin driving a nail along the firing channel axis, and a radially outer deflection position in which radial deflection of a nail to be driven in is possible, about a pivot axis relative to the base body.

3. A kit for retrofitting a guide element to a nail setting tool, the kit comprising a basic body and a movable guide element according to claim 1 attached thereto, such that the movable guide element can be pivoted about a pivot axis relative to the basic body between a guide position and a deflection position so as to be adapted to partially close the open front end portion of the barrel of a nail setting device and to allow radial deflection of a nail to be driven.

4. A nail setting device including a base body, the base body comprising a barrel for guiding a nail to be driven into a workpiece and a firing pin driving the nail, the barrel extending between a front free end, via which a nail emerges when being driven into a workpiece, and a rear end on a drive side, wherein the barrel internally forms a firing channel along a firing channel axis and has an open front end section, in which the open front end section surrounds the firing channel over only a partial circumferential portion, with a kit according to claim 3 attached thereto.

5. A system, comprising:

a nail setting device having a base body, which comprises a barrel for guiding a nail to be driven into a work piece and a firing pin driving the nail, the barrel extending between a front free end, via which the nail emerges when being driven into a workpiece, and a rear end on a drive side, wherein the barrel internally forms a firing channel along a firing channel axis and has an open front end section in which the open front end section surrounds a firing channel over only a partial circumferential portion, a movable guide element according to claim 1, attachable to the nail setting device in such a way that the nail setting device is movable between a radially inner guide position relative to the firing channel axis, in which the nail setting device partially closes the open front end section of the barrel and guides a nail to be driven in and the firing pin driving the nail along the firing channel axis, and a radially outer deflection position, in which radial deflection of a nail to be driven in is possible, about a pivot axis relative to the base body of the nail setting device, and a stationary guide element, which is immovably attachable to the nail setting device in such a way that the stationary guide element at least partially closes the open front end section of the barrel and guides a nail to be driven in and the firing pin driving along the firing channel axis, such that a user may selectively detachably attach the movable guide element or the stationary guide element to the nail setting device.

6. A retrofit system, comprising:

a basic body;

a movable guide element according to claim 1, attachable to the basic body in such a way that the movable guide element is moveable between a radially inner guide position relative to the firing channel axis, in which the movable guide element partially closes the open front end section of the barrel and guides a nail to be driven in and the firing pin driving the nail along the firing channel axis, a radially outer deflection position, in which radial reflection of the nail to be driven in is possible, about a pivot axis relative to the base body of a nail setting device; and a stationary guide element, which is immovably attachable to the basic body in such a way that the stationary guide element at least partially closes the open front end section of the barrel and guides the nail to be driven in and the firing pin driving the nail along the firing channel axis, wherein the movable guide element or the stationary guide element selectively detachably attachable to the basic body.

7. A movable guide element, configured to be attached to a nail setting device, the nail setting device having a base body, comprising a barrel for guiding a nail to be driven into a work piece and firing pin driving the nail, the barrel extending between a front free end, via which the nail emerges when being driven into a workpiece, and a rear end on a drive side, wherein the barrel internally has a firing channel along a firing channel axis and has an open front end section in which the open front end section surrounds the firing channel over only a partial circumferential portion, or to a basic body for a kit for retrofitting a guide element to the nail setting device, in such a way that the movable guide element is moveable between a radially inner guide position relative to the firing channel axis, in which the movable guide element partially closes the open front end section of the barrel and guides a nail to be driven in and the firing pin driving the nail along the firing channel axis, and a radially outer deflection position, in which radial deflection of the nail to be driven in is possible, about a pivot axis relative to the base body, wherein a linearly extending guide groove for guiding the nail to be driven in and the firing pin is in an inner end face facing the firing channel axis in an installed state, and wherein the rear end of the linearly extending guide groove opens into a central recess which completely penetrates the movable guide element from an inside to an outside and separates two rearwardly projecting, mutually opposite webs, wherein inlet contours are provided on both sides of the linearly extending guide groove in transition to the webs, wherein on one side of the linearly extending guide groove to inlet contour is stepped and comprises a front inlet slope and a rear inlet slope inclined outwardly relative thereto, and wherein the front inlet slope is inclined by an angle of at least 20° and at most 40° to the inner end face, and the rear inlet slope is inclined by an angle of at least 50° and at most 70° to the inner end face.

8. An arrangement, comprising:

a nail setting device including a base body comprising a barrel for guiding a nail to be driven into a work piece and a firing pin driving the nail, the barrel extending between a front free end, via which a nail emerges when being driven into a work piece, and a rear end of a drive side, the barrel internally has a firing channel axis and has an open front end section in which the open front end section surrounds the firing channel over only in partial circumferential portion; and a movable guide element according to claim 7 attached thereto, such that the movable guide element is movable between a radially inner guide position relative to the firing channel axis, in which the movable guide element partially closes the front end section of the barrel and guides a firing pin driving a nail along the firing channel axis, and a radially outer deflection position in which radial deflection of a nail to be driven in is possible, about a pivot axis relative to the base body.

9. A kit for retrofitting a guide element to a nail setting tool, the kit comprising a basic body and a movable guide element according to claim 7 attached thereto, such that the movable guide element can be pivoted about a pivot axis relative to the basic body between a guide position and a deflection position so as to be adapted to partially close the open front end portion of the barrel of a nail setting device and to allow radial deflection of a nail to be driven.

10. A system, comprising:

a nail setting device having a base body, which comprises a barrel for guiding a nail to be driven into a work piece and a firing pin driving the nail, the barrel extending between a front free end, via which the nail emerges when being driven into a workpiece, and a rear end on a drive side, wherein the barrel internally forms a firing channel along a firing channel axis and has an open front end section in which the open front end section surrounds a firing channel over only a partial circumferential portion, a movable guide element according to claim 7, attachable to the nail setting device in such a way that the nail setting device is movable between a radially inner guide position relative to the firing channel axis, in which the nail setting device partially closes the open front end section of the barrel and guides a nail to be driven in and the firing pin driving the nail along the firing channel axis, and a radially outer deflection position, in which radial deflection of a nail to be driven in is possible, about a pivot axis relative to the base body of the nail setting device, and a stationary guide element, which is immovably attachable to the nail setting device in such a way that the stationary guide element at least partially closes the open front end section of the barrel and guides a nail to be driven in and the firing pin driving along the firing channel axis, such that a user may selectively detachably attach the movable guide element or the stationary guide element to the nail setting device.

11. A retrofit system, comprising:

a basic body;

a movable guide element according to claim 7, attachable to the basic body in such a way that the movable guide element is moveable between a radially inner guide position relative to the firing channel axis, in which the movable guide element partially closes the open front end section of the barrel and guides a nail to be driven in and the firing pin driving the nail along the firing channel axis, a radially outer deflection position, in which radial reflection of the nail to be driven in is possible, about a pivot axis relative to the base body of a nail setting device; and a stationary guide element, which is immovably attachable to the basic body in such a way that the stationary guide element at least partially closes the open front end section of the barrel and guides the nail to be driven in and the firing pin driving the nail along the firing channel axis, wherein the movable guide element or the stationary guide element selectively detachably attachable to the basic body.

* * * * *